(12) United States Patent
Kanao et al.

(10) Patent No.: US 11,593,689 B2
(45) Date of Patent: Feb. 28, 2023

(54) CALCULATING DEVICE, CALCULATION PROGRAM, RECORDING MEDIUM, AND CALCULATION METHOD

(71) Applicant: KABUSHIKI KAISHA TOSHIBA, Tokyo (JP)

(72) Inventors: Taro Kanao, Kanagawa (JP); Hayato Goto, Kanagawa (JP); Kosuke Tatsumura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 882 days.

(21) Appl. No.: 16/289,820

(22) Filed: Mar. 1, 2019

(65) Prior Publication Data
US 2020/0090066 A1 Mar. 19, 2020

(51) Int. Cl.
*G06N 10/00* (2022.01)
*G06N 7/00* (2023.01)
(Continued)

(52) U.S. Cl.
CPC .............. *G06N 7/00* (2013.01); *G06F 9/3001* (2013.01); *G06F 17/13* (2013.01); *G06F 17/18* (2013.01)

(58) Field of Classification Search
CPC .......... G06N 7/00; G06N 5/003; G06N 7/005; G06N 3/0445; G06N 3/0472; G06N 3/063;
(Continued)

(56) References Cited

U.S. PATENT DOCUMENTS 10,473,583 B2 * 11/2019 Poehler ...................... G01J 3/42
10,860,679 B2 * 12/2020 Goto ........................ G06F 17/11
(Continued)

FOREIGN PATENT DOCUMENTS

CN 1497402 A * 5/2004 ............ G05B 11/32
CN 105049353 A * 11/2015
(Continued)

OTHER PUBLICATIONS

Inagaki et al., "A coherent Ising machine for 2000-node optimization problems," Science, 10.1126, pp. 1-8 (Oct. 20, 2016).
(Continued)

*Primary Examiner* — Kandasamy Thangavelu
(74) *Attorney, Agent, or Firm* — Finnegan, Henderson, Farabow, Garrett & Dunner, LLP

(57) ABSTRACT

According to one embodiment, a calculating device includes a processor repeating a processing procedure. The processing procedure includes first, second, and third variable updates. The first variable update includes updating an ith entry of a first variable $x_i$ by adding an ith entry of a first function to the first variable $x_i$. The second variable update includes updating the second variable $y_i$ by adding, to the second variable $y_i$, an arithmetic result of an ith entry of a second function, an ith entry of a third function, and an ith entry of a first element function. The third variable update includes updating the third variable z by adding an ith entry of a second element function to the third variable z. The processor performs at least an output of at least one of the first variable $x_i$ or a function of the first variable $x_i$.

14 Claims, 12 Drawing Sheets

(51) Int. Cl.
*G06F 9/30* (2018.01)
*G06F 17/18* (2006.01)
*G06F 17/13* (2006.01)

(58) Field of Classification Search
CPC ........ G06F 9/3001; G06F 17/13; G06F 17/18; G06F 40/30; G06F 16/9535; G01J 3/42; G05B 19/186; G06Q 40/02; G09G 5/06; H01J 49/42; H04N 19/85
See application file for complete search history.

(56) References Cited

U.S. PATENT DOCUMENTS

| 11,003,734 | B2* | 5/2021 | Goto | G06F 17/13 |
| 2013/0144925 | A1* | 6/2013 | Macready | G06F 17/10 708/620 |
| 2015/0205759 | A1* | 7/2015 | Israel | G06F 17/11 703/2 |
| 2016/0180552 | A1* | 6/2016 | Li | G09G 5/06 345/591 |
| 2018/0048892 | A1* | 2/2018 | Norkin | H04N 19/85 |
| 2018/0157775 | A1* | 6/2018 | Ronagh | G06N 10/00 |
| 2022/0051120 | A1* | 2/2022 | Hidaka | G06Q 10/04 |

FOREIGN PATENT DOCUMENTS

| CN | 105070631 A | * | 11/2015 | H01J 49/42 |
| CN | 107305543 A | * | 10/2017 | G06F 40/30 |
| CN | 107980145 A | * | 5/2018 | G06N 10/00 |
| EP | 3113084 A1 | * | 1/2017 | G06N 10/00 |
| EP | 3139226 A2 | * | 3/2017 | G05B 19/186 |
| JP | 5282219 B2 | * | 9/2013 | G06Q 40/02 |
| WO | WO 2015035556 A1 | * | 3/2015 | G06F 16/9535 |

OTHER PUBLICATIONS

Goto, "Bifurcation-based adiabatic quantum computation with a nonlinear oscillator network," Scientific Reports, 6:21686, pp. 1-8 (Feb. 22, 2016).

Haribara et al., "Performance evaluation of coherent Ising machines against classical neural networks," Quantum Sci. Technol., 2:044002, pp. 1-8 (Aug. 14, 2017).

Leimkuhler et al., Simulating Hamiltonian Dynamics, Chapter 11 ("Molecular dynamics"), pp. 287-314 (2004).

* cited by examiner

CALCULATING DEVICE, CALCULATION PROGRAM, RECORDING MEDIUM, AND CALCULATION METHOD

CROSS-REFERENCE TO RELATED APPLICATIONS

This application is based upon and claims the benefit of priority from Japanese Patent Application No. 2018-173075, filed on Sep. 14, 2018; the entire contents of which are incorporated herein by reference.

FIELD

Embodiments described herein relate generally to a calculating device, a calculation program, a recording medium, and a calculation method.

BACKGROUND

Optimization problems appear in various social issues. Ising problems are one example of optimization problems. It is desirable to solve large-scale optimization problems quickly.

DETAILED DESCRIPTION

Figure 1:
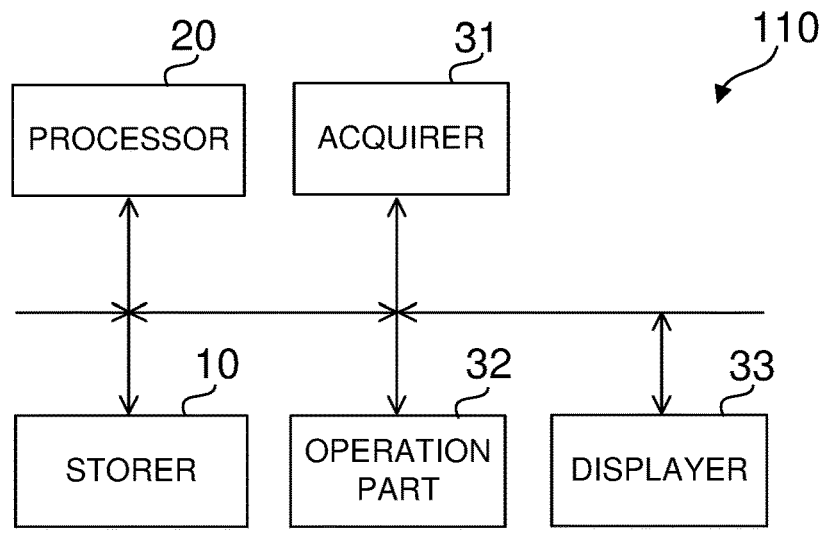
FIG. 1 is a schematic view showing an example of a calculating device according to an embodiment.

According to one embodiment, a calculating device includes a processor configured to repeat a processing procedure. The processing procedure includes a first variable update, a second variable update, and a third variable update. The first variable update includes updating an ith entry of a first variable $x_i$ by adding an ith entry of a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the ith entry of the first function includes an ith entry of a second variable $y_i$. The ith entry of the second variable $y_i$ is one of a second variable set $\{y\}$. The ith entry of the first function is one of a first function set. The second variable update includes updating the ith entry of the second variable $y_i$ by adding, to the ith entry of the second variable $y_i$ before the second variable update, an arithmetic result of an ith entry of a second function, an ith entry of a third function, and an ith entry of a first element function. A variable of the ith entry of the second function includes the ith entry of the first variable $x_i$. A variable of the ith entry of the third function includes at least a part of a first parameter set $\{J\}$ and at least a part of the first variable set $\{x\}$. A variable of the ith entry of the first element function includes a product of the ith entry of the second variable $y_i$ and a third variable z. The ith entry of the second function is one of a second function set. The ith entry of the third function is one of a third function set. The ith entry of the first element function is one of a first element function set. The third variable update includes updating the third variable z by adding an ith entry of a second element function to the third variable z before the third variable update. The third variable z is one of a third variable set $\{z\}$. A variable of the second element function includes a difference between a first calculation parameter and a mean square of at least a part of the second variable set $\{y\}$. The processor is configured to perform at least an output of at least one of the ith entry of the first variable $x_i$ obtained after the repeating of the processing procedure or a function of the ith entry of the first variable $x_i$ obtained after the repeating of the processing procedure.

According to another embodiment, a calculating device includes a processor configured to repeat a processing procedure. The processing procedure includes a first variable update, a second variable update, a third variable update, and a fourth variable update. The first variable update includes updating an ith entry of a first variable $x_i$ by adding an ith entry of a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the ith entry of the first function includes an ith entry of a second variable $y_i$ and a third variable b. The ith entry of the second variable $y_i$ is one of a second variable set $\{y\}$. The ith entry of the first function is one of a first function set. The second variable update includes updating the ith entry of the second variable $y_i$ by adding an ith entry of a second function and an ith entry of a third function to the ith entry of the second variable $y_i$ before the second variable update. A variable of the ith entry of the second function includes the ith entry of the first variable $x_i$. A variable of the ith entry of the third function includes at least a part of a first parameter set $\{J\}$ and at least a part of the first variable set $\{x\}$. The third variable update includes updating the third variable b by adding a first element function to the third variable b before the third variable update. A variable of the first element function includes a fourth variable $P_b$. The fourth variable update includes updating the fourth variable $P_b$ by adding a second element function to the fourth variable $P_b$ before the fourth variable update. A variable of the second element function includes a difference between a first calculation parameter and a mean square of at least a part of the second variable set $\{y\}$. The processor is configured to perform at least an output of at least one of the ith entry of the first variable $x_i$ obtained after the repeating of the processing procedure or a function of the ith entry of the first variable $x_i$ obtained after the repeating of the processing procedure.

According to another embodiment, a calculating device includes a processor configured to repeat a processing procedure. The processing procedure includes a first variable update, a second variable update, a third variable update, and a fourth variable update. The first variable update includes updating an ith entry of a first variable $x_i$ by adding an ith entry of a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the ith entry of the first function includes an ith entry of a second variable $y_i$ and a third variable b. The ith entry of the second variable $y_i$ is one of a second variable set $\{y\}$. The ith entry of the first function is one of a first function set. The second variable update includes updating the ith entry of the second variable $y_i$ by adding, to the ith entry of the second variable $y_i$ before the second variable update, a product of the third variable b and a sum of an ith entry of a second function and an ith entry of a third function. A variable of the ith entry of the second function includes the ith entry of the first variable $x_i$. A variable of the ith entry of the third function includes at least a part of a first parameter set $\{J\}$ and at least a part of the first variable set $\{x\}$. The third variable update includes updating the third variable b by adding a first element function to the third variable b before the third variable update. A variable of the first element function includes a fourth variable $P_b$. The fourth variable update includes updating the fourth variable $P_b$ by adding a second element function to the fourth variable $P_b$ before the fourth variable update. A variable of the second element function includes a difference between a first calculation parameter and a mean square of at least a part of the second variable set $\{y\}$. The processor being configured to perform at least an output of at least one of the ith entry of the first variable $x_i$ obtained after the repeating of the processing procedure or a function of the ith entry of the first variable $x_i$ obtained after the repeating of the processing procedure.

According to another embodiment, a calculation program causes a computer to repeat a processing procedure. The processing procedure includes a first variable update, a second variable update, and a third variable update. The first variable update includes updating an ith entry of a first variable $x_i$ by adding an ith entry of a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the ith entry of the first function includes an ith entry of a second variable $y_i$. The ith entry of the second variable $y_i$ is one of a second variable set $\{y\}$. The ith entry of the first function is one of a first function set. The second variable update includes updating the ith entry of the second variable $y_i$ by adding, to the ith entry of the second variable $y_i$ before the second variable update, an arithmetic result of an ith entry of a second function, an ith entry of a third function, and an ith entry of a first element function. A variable of the ith entry of the second function includes the ith entry of the first variable $x_i$. A variable of the ith entry of the third function includes at least a part of a first parameter set $\{J\}$ and at least a part of the first variable set $\{x\}$. A variable of the ith entry of the first element function includes a product of the ith entry of the second variable $y_i$ and a third variable z. The ith entry of the second function is one of a second function set. The ith entry of the third function is one of a third function set. The ith entry of the first element function is one of a first element function set. The third variable update includes updating the third variable z by adding an ith entry of a second element function to the third variable z before the third variable update. The third variable z is one of a third variable set $\{z\}$. A variable of the second element function includes a difference between a first calculation parameter and a mean square of at least a part of the second variable set $\{y\}$. The processor performs at least an output of at least one of the ith entry of the first variable $x_i$ obtained after the repeating of the processing procedure or a function of the ith entry of the first variable $x_i$ obtained after the repeating of the processing procedure.

According to another embodiment, a recording medium is computer-readable. A calculation program is recorded in the recording medium. The calculation program causes a computer to repeat a processing procedure. The processing procedure includes a first variable update, a second variable update, and a third variable update. The first variable update includes updating an ith entry of a first variable $x_i$ by adding an ith entry of a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the ith entry of the first function includes an ith entry of a second variable $y_i$. The ith entry of the second variable $y_i$ is one of a second variable set $\{y\}$. The ith entry of the first function is one of a first function set. The second variable update includes updating the ith entry of the second variable $y_i$ by adding, to the ith entry of the second variable $y_i$ before the second variable update, an arithmetic result of an ith entry of a second function, an ith entry of a third function, and an ith entry of a first element function. A variable of the ith entry of the second function includes the ith entry of the first variable $x_i$. A variable of the ith entry of the third function includes at least a part of a first parameter set $\{J\}$ and at least a part of the first variable set $\{x\}$. A variable of the ith entry of the first element function includes a product of the ith entry of the second variable $y_i$ and a third variable z. The ith entry of the second function is one of a second function set. The ith entry of the third function is one of a third function set. The ith entry of the first element function is one of a first element function set. The third variable update includes updating the third variable z by adding an ith entry of a second element function to the third variable z before the third variable update. The third variable z is one of a third variable set $\{z\}$. A variable of the second element function includes a difference between a first calculation parameter and a mean square of at least a part of the second variable set $\{y\}$. The processor performs at least an output of at least one of the ith entry of the first variable $x_i$ obtained after the repeating of the processing procedure or a function of the ith entry of the first variable $x_i$ obtained after the repeating of the processing procedure.

According to another embodiment, a calculation method includes repeating a processing procedure. The processing procedure includes a first variable update, a second variable update, and a third variable update. The first variable update includes updating an ith entry of a first variable $x_i$ by adding an ith entry of a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the ith entry of the first function includes an ith entry of a second variable $y_i$. The ith entry of the second variable $y_i$ is one of a second variable set $\{y\}$. The ith entry of the first function is one of a first function set. The second variable update includes updating the ith entry of the second variable $y_i$ by adding, to the ith entry of the second variable $y_i$ before the second variable update, an arithmetic result of an ith entry of a second function, an ith entry of a third function, and an ith entry of a first element function. A variable of the ith entry of the second function includes the ith entry of the first variable $x_i$.

A variable of the ith entry of the third function includes at least a part of a first parameter set {J} and at least a part of the first variable set {x}. A variable of the ith entry of the first element function includes a product of the ith entry of the second variable $y_i$ and a third variable z. The ith entry of the second function is one of a second function set. The ith entry of the third function is one of a third function set. The ith entry of the first element function is one of a first element function set. The third variable update includes updating the third variable z by adding an ith entry of a second element function to the third variable z before the third variable update. The third variable z is one of a third variable set {z}. A variable of the second element function includes a difference between a first calculation parameter and a mean square of at least a part of the second variable set {y}. The processor performs at least an output of at least one of the ith entry of the first variable $x_i$ obtained after the repeating of the processing procedure or a function of the ith entry of the first variable $x_i$ obtained after the repeating of the processing procedure.

Various embodiments are described below with reference to the accompanying drawings.

In the specification and drawings, components similar to those described previously or illustrated in an antecedent drawing are marked with like reference numerals, and a detailed description is omitted as appropriate.

First Embodiment

FIG. 1 is a schematic view showing an example of a calculating device according to an embodiment.

As shown in FIG. 1, the calculating device 110 according to the embodiment includes, for example, a processor 20 and a storer 10. The processor 20 includes, for example, a CPU (Central Processing Unit), etc. The processor 20 includes, for example, an electronic circuit, etc. The storer 10 can store various data. The storer 10 is, for example, memory. The storer 10 may include at least one of ROM (Read Only Memory) or RAM (Random Access Memory). The calculating device 110 may be a calculation system.

In the example, an acquirer 31 is provided in the calculating device 110. For example, the acquirer 31 can acquire various data. The acquirer 31 includes, for example, an I/O port, etc. The acquirer 31 may have the function of an outputter. For example, the acquirer 31 may have communication functions.

As shown in FIG. 1, the calculating device 110 may include an operation part 32, a displayer 33, etc. The operation part 32 may include, for example, a device having an operation function (e.g., a keyboard, a mouse, a touch input panel, a voice recognition input device, etc.). The displayer 33 may include various displays.

The multiple components that are included in the calculating device 110 can communicate with one another by at least one of a wireless or wired method. The locations where the multiple components included in the calculating device 110 are provided may be different from each other. For example, a general-purpose computer may be used as the calculating device 110. For example, multiple computers that are connected to one another may be used as the calculating device 110. A dedicated circuit may be used as at least a part of the calculating device 110 (e.g., the processor 20, the storer 10, etc.). For example, multiple circuits that are connected to one another may be used as the calculating device 110.

Examples of the multiple components included in the calculating device 110 are described below.

An example of an operation performed by the calculating device 110 according to the embodiment will now be described.

Figure 2:
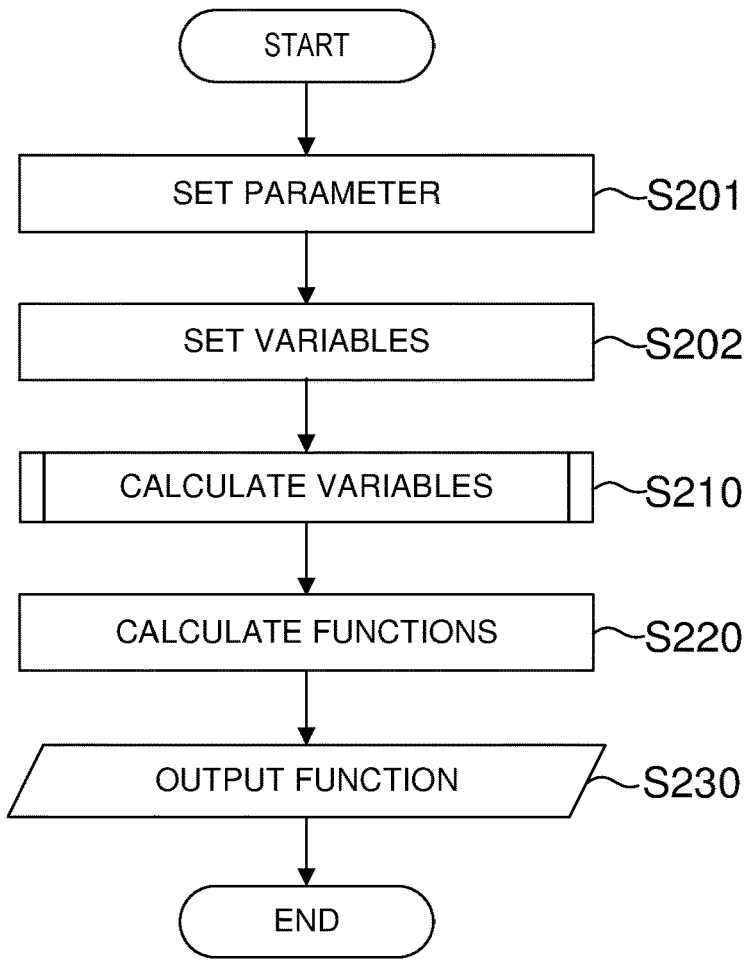
FIG. 2 is a flowchart illustrating the operation of the calculating device according to the embodiment.

FIG. 2 is a flowchart illustrating the operation of the calculating device according to the embodiment.

As shown in FIG. 2, a parameter is set (step S201). The parameter includes, for example, a first parameter set {J}. The parameter may further include, for example, a second parameter set {h}. Examples of these parameters are described below.

Multiple variables are set (step S202). The variables include, for example, a first variable set {x} and a second variable set {y}. The variables may further include, for example, a third variable set {z}. The variables are initialized to appropriate values in step S202. Examples of the initialization are described below.

Calculations (e.g., updating) of the multiple variables are performed (step S210). For example, the time evolution is calculated for the multiple variables. For example, the first variable set {x} is updated; and the second variable set {y} is updated. The third variable set {z} also may be updated. These calculations are repeated until the prescribed conditions (described below) are satisfied. Step S210 is, for example, a subroutine.

After the subroutine (the update of the variables), for example, a function is calculated (step S220). For example, a function of the at least one element included in the first variable set {x} is calculated. In one example, this function is the sign of at least one element included in the first variable set {x}.

This function is output (step S230). For example, in one example, the sign of the at least one element included in the first variable set {x} is output. In step S230, the at least one element included in the first variable set {x} after the update may be output. In such a case, step S220 may be omitted.

In the embodiment, in the calculations of the multiple variables recited above (step S210), for example, the update of the first variable set {x} is performed using the second variable set {y}. Then, the update of the second variable set {y} is performed using the first variable set {x}. These updates are performed multiple times. In one example, in one of the updates of the multiple times, the update of the second variable set {y} is performed after the update of the first variable set {x}. In one other example, for example, in one of the updates of the multiple times, the update of the first variable set {x} is performed after the update of the second variable set {y}. The update of the third variable set {z} also may be performed.

An optimization problem can be calculated quickly by the calculating device 110. The optimization problem is, for example, a combinatorial optimization problem (e.g., a discrete optimization problem). For example, a large-scale Ising problem can be solved quickly.

An Ising problem will now be described as an example of a calculation performed by the calculating device 110.

For example, an Ising energy $E_{Ising}$ is represented by the following first formula.

$$E_{Ising} = -\frac{1}{2}\sum_{i=1}^{N}\sum_{j=1}^{N}J_{i,j}s_i s_j + \sum_{i=1}^{N}h_i s_i \tag{1}$$

In the first formula recited above, "N" is the number of Ising spins. "$s_i$" is the Ising spin of the ith entry. For example, "$s_i$"=±1. For example, "J" is one matrix. One example of the first parameter set {J} recited above is a matrix J. The matrix J is a real symmetric matrix. In a real symmetric matrix, all of the diagonal entries (the diagonal elements) are zero.

A classical model of a quantum bifurcation machine (hereinbelow, called a classical bifurcation machine) is proposed in relation to the first formula recited above. The equations of motion for the classical bifurcation machine are provided by the following second to fourth formulas.

$$\frac{dx_i}{dt} = \frac{\partial H}{\partial y_i} = y_i\{D + p(t) + K(x_i^2 + y_i^2)\} - c\sum_{j=1}^{N} J_{i,j} y_j \quad (2)$$

$$\frac{dy_i}{dt} = -\frac{\partial H}{\partial x_i} = x_i\{-D + p(t) - K(x_i^2 + y_i^2)\} - ch_i a(t) + c\sum_{j=1}^{N} J_{i,j} x_j \quad (3)$$

$$H = \sum_{i=1}^{N} \left[ \frac{D}{2}(x_i^2 + y_i^2) - \frac{p(t)}{2}(x_i^2 - y_i^2) + \frac{K}{4}(x_i^2 + y_i^2)^2 + ch_i x_i a(t) - \frac{c}{2}\sum_{j=1}^{N} J_{i,j}(x_i x_j + y_i y_j) \right] \quad (4)$$

In the second to fourth formulas, "N" corresponds to, for example, the number of Ising spins. For example, "0" corresponds to "detuning." "c" is a constant. For example, "p" corresponds to the "pump rate." For example, "K" corresponds to the "Kerr coefficient." For example, these values may be preset. The second parameter set {h} may not be provided in the second to fourth formulas. In such a case, the terms that include elements of {h} inside the third formula and the fourth formula are ignored.

In the second to fourth formulas recited above, the sign "±1" of the final value of "$x_i$" becomes the Ising spin "$s_i$" of the optimal solution (the ground state) when p(t) is increased from zero to a sufficiently large value. "a(t)" is a parameter that increases with "p(t)." For example, "a(t)" is represented by the following fifth formula.

$$a(t) = \sqrt{p(t)/K} \quad (5)$$

The classical bifurcation machine recited above can be considered to be a Hamiltonian dynamical system in which "H" is the Hamiltonian in the second to fourth formulas.

On the other hand, simulated annealing is known. A sequential update algorithm is employed in this method. In the sequential update algorithm, multiple spins are updated one at a time. Such a sequential update algorithm is not suited for parallel computation.

Conversely, it is considered that the equations of motion for the classical bifurcation machine recited above are solved by solution method discretizing the differential equations using a digital computer. This algorithm is different from simulated annealing and is a parallel update algorithm. Multiple variables can be updated simultaneously in the parallel update algorithm. Therefore, higher speeds due to parallel computation can be expected.

It is considered that an approach that uses the second to fifth formulas recited above has the following problems. A calculation that uses the matrix which has the largest calculation amount is necessary to update both the first variable x and the second variable y. Because the equations of motion recited above cannot be solved easily numerically, for example, it is necessary to use a solution method discretizing the differential equations (e.g., a fourth-order Runge-Kutta method, etc.) having a large calculation amount.

Conversely, in one example of the embodiment, for example, instead of the simultaneous ordinary differential equations shown in the second to fourth formulas, the simultaneous ordinary differential equations shown in the following sixth to eighth formulas are used.

$$H' = F(y_B, t) + \sum_{i=1}^{N} \left[ \frac{D}{2} x_i^2 - \frac{p(t)}{2} x_i^2 + \frac{K}{4} x_i^4 + ch_i x_i a(t) - \frac{c}{2} \sum_{j=1}^{N} J_{i,j} x_i x_j \right] \quad (6)$$

$$\frac{dx_i}{dt} = \frac{\partial H'}{\partial y_i} = \frac{\partial F(y_B, t)}{\partial y_i} = f_i(y_B, t) \quad (7)$$

$$\frac{dy_i}{dt} = -\frac{\partial H'}{\partial x_i} = -Dx_i + p(t)x_i - Kx_i^3 - ch_i a(t) + c\sum_{j=1}^{N} J_{i,j} x_j \quad (8)$$

"$y_B$" recited above corresponds to all of the elements included in the second variable set {y} (e.g., the first entry of the second variable $y_1$ to the Nth entry of the second variable $y_N$). "$f_i(y_B, t)$" is a function of an ith entry of a second function $y_i$.

As shown in the seventh formula, a first variable update updates an ith entry of a first variable $x_i$ by adding an ith entry of a first function to the ith entry of the first variable $x_i$ before the first variable update. The ith entry of the first function is "$f_i(y_B, t)$." The ith entry of the first function is one of a first function set.

In a first calculation method (a first calculating device), the following ninth formula is used as "$f_i(y_B, t)$." In such a case, the seventh formula is represented by the tenth formula.

$$F(y_B, t) = \frac{D}{2} \sum_{i=1}^{N} y_i^2 \quad (9)$$

$$\frac{dx_i}{dt} = \frac{\partial F(y_B, t)}{\partial y_i} = f_i(y_B, t) = Dy_i \quad (10)$$

Accordingly, in the first calculation method (the first calculating device), the update of the first variable x is performed based on the tenth formula recited above. Then, the update of the second variable y is performed based on the eighth formula recited above. In the first calculation method as shown in the tenth formula, the variable of the ith entry of the first function includes the product of the parameter "D" and "$y_i$." The parameter "D" may be 1.

The processing procedure is repeated in the first calculation method (the first calculating device). The processing procedure includes the first variable update and a second variable update.

In another example of the embodiment, the following eleventh to thirteenth formulas are used.

$$\frac{dx_i}{dt} = y_i \quad (11)$$

$$\frac{dy_i}{dt} = -[D - p(t)]x_i - x_i^3 + c\sum_{j=1}^{N} J_{ij} x_j - zy_i \quad (12)$$

$$\frac{dz}{dt} = r\left(\frac{1}{N}\sum_{i=1}^{N} y_i^2 - T(t)\right) \quad (13)$$

In a second calculation method (a second calculating device) as well, the processing procedure is repeated. In the second calculation method (the second calculating device), the processing procedure includes a first variable update, a second variable update, and a third variable update.

In the second calculation method (the second calculating device), the first variable update is performed based on the eleventh formula (or the tenth formula). For example, the first variable update includes updating the ith entry of the first variable $x_i$ by adding the ith entry of the first function to the ith entry of the first variable $x_i$ before the first variable update. "i" is an integer not less than 1 and not more than N. "N" is an integer of 2 or more. The ith entry of the first variable $x_i$ is one of a first variable set $\{x\}$. The variable of the ith entry of the first function includes an ith entry of a second variable $y_i$. The ith entry of the second variable $y_i$ is one of a second variable set $\{y\}$. The ith entry of the first function is one of a first function set.

In the second calculation method (the second calculating device), the ith entry of the first function is "$f_i(y_B, t)$." In the second calculation method (the second calculating device), the ith entry of the first function may be "$Dy_i$" (the tenth formula). In the second calculation method (the second calculating device), the ith entry of the first function may be "$y_i$" (the eleventh formula).

As shown in the twelfth formula, the second variable update includes updating the ith entry of the second variable $y_i$ by adding, to the ith entry of the second variable $y_i$ before the second variable update, the arithmetic result of an ith entry of a second function, an ith entry of a third function, and an ith entry of a first element function.

The ith entry of the second function corresponds to the first term and the second term of the right side of the twelfth formula. The ith entry of the third function corresponds to the third term of the right side of the twelfth formula. The ith entry of the first element function corresponds to the fourth term of the twelfth formula.

The variable of the ith entry of the second function includes the ith entry of the first variable $x_i$. The variable of the ith entry of the third function includes at least a part of the first parameter set $\{J\}$ and at least a part of the first variable set $\{x\}$. The variable of the ith entry of the first element function includes the product of the ith entry of the second variable $y_i$ and a third variable z. The ith entry of the second function is one of a second function set. The ith entry of the third function is one of a third function set. The ith entry of the first element function is one of a first element function set.

As shown in the thirteenth formula, the third variable update includes updating the third variable z by adding an ith entry of a second element function to the third variable z before the third variable update. The variable of the second element function includes the difference between a first calculation parameter T(t) and the mean square of at least a part of the second variable set $\{y\}$. The mean square is proportional to the variance of the at least a part of the second variable set $\{y\}$ recited above. The third variable z is one of a third variable set $\{z\}$.

For example, the set of 1 to N is split into multiple partial sets not having common portions. The number of multiple partial sets is "$N_s$." The number of elements included in each of the multiple partial sets is "$N_i$." For example, $z_i$ (i=1 to $N_s$) is used as the third variable set $\{z\}$ recited above. In the case where "i" of the twelfth formula is included in the ith partial set "$S_i$," "$z_i$" is used as the third variable z of the final term of the right side of the twelfth formula. "$z_i$" is updated by using the third variable z as "$z_i$" in the thirteenth formula. Then, the sum over "i" in the thirteenth formula is performed in the case where "i" is included in "$S_i$." "$N_i$" is the number of elements of "$S_i$" (the number of elements included in "$S_i$"). The sum over "i" in the thirteenth formula is the sum of squares of "$N_i$" second variables y. In the thirteenth formula, "N" of the denominator of the first term of the right side of the thirteenth formula is replaced with "$N_i$." Then, the first term of the thirteenth formula corresponds to the mean square of the second variable y corresponding to the numeral included in "$S_i$" which is one of the multiple partial sets.

In an example of the first calculation method (the first calculating device) and the second calculation method (the second calculating device) (e.g., the example of FIG. 3 described below), the "processing procedure" includes step S110, step S120, and step S130. The "processing procedure" includes, for example, the loop processing over "i" of step S110, step S120, and step S130. The "processing procedure" is multiply repeated.

Figure 3:
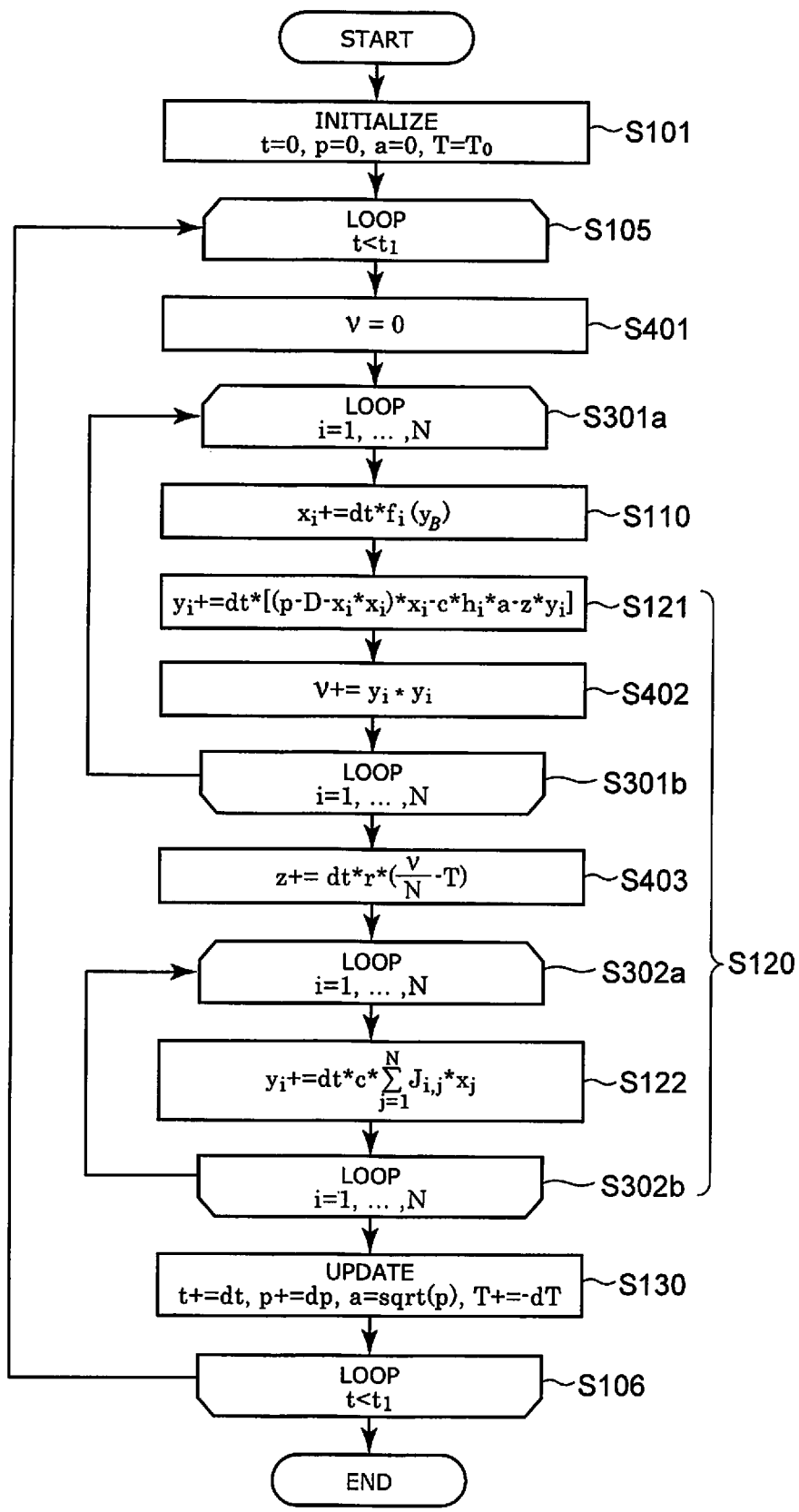
FIG. 3 is a flowchart illustrating a part of the operation of the calculating device according to the embodiment.

For example, the first calculation parameter T(t) is updated by repeating the processing procedure. In the example of FIG. 3, the first calculation parameter T(t) is updated in step S130. For example, the first calculation parameter T(t) after the processing procedure is different from the first calculation parameter T(t) before the processing procedure. For example, the first calculation parameter T(t) after the processing procedure is smaller than the first calculation parameter T(t) before the processing procedure.

In the sixth to thirteenth formulas, for example, "N" corresponds to the number of Ising spins. For example, "D" corresponds to the "detuning." "c" is a constant. For example, "p" corresponds to the "pump rate" (e.g., an operation parameter). For example, "K" corresponds to the "Kerr coefficient." For example, these values may be preset. The second parameter set $\{h\}$ may not be provided in the sixth to thirteenth formulas. In such a case, the term that includes the element of $\{h\}$ inside the eighth formula is ignored. Similarly to the eighth formula, the term that includes the element of $\{h\}$ may be provided in the twelfth formula.

A product-sum operation that relates to the matrix J which has the largest calculation amount is performed only in the update of the second variable y and is not performed in the update of the first variable x. Accordingly, the calculation amount is reduced. In these formulas, the time derivative of the first variable x includes the second variable y. For example, the time derivative of the first variable x does not include the first variable x. The time derivative of the second variable y includes the first variable x. In the first calculation method, for example, the time derivative of the second variable y does not include the second variable y. x and y are separate from each other in the Hamiltonian. Therefore, a stable solution method is applicable in which the calculation amount is small. For example, a method called a symplectic Euler method is applicable. In the sixth to thirteenth formulas recited above, "p" is eliminated from the time derivative of "x."

It was found that high performance (e.g., high accuracy) can be maintained using such a method. In the calculating device according to the embodiment, the equations of motion for the Hamiltonian dynamical system (the new classical bifurcation machine) having the separable Hamiltonian recited above is solved using, for example, a symplectic Euler method. The calculating device according to the embodiment is configured to perform the calculation of such a new algorithm as quickly as possible by parallel computation.

In the embodiment, for example, the sign ("±1") of the final value of the first variable $x_i$ becomes the Ising spin $s_i$ of the optimal solution (the ground state) when "p(t)" is increased from zero to a sufficiently large value.

For example, the first variable $x_i$ and the second variable $y_i$ are initialized to appropriate values in the setting of the variables (step S202). In the case where the third variable z is provided, the third variable z is initialized to the appropriate value in the setting of the variables (step S202). For example, these variables are initialized randomly using random numbers having absolute values of 0.1 or less.

Several examples of step S210 (referring to FIG. 2) will now be described.

FIG. 3 is a flowchart illustrating a part of the operation of the calculating device according to the embodiment.

FIG. 3 illustrates step S210. The multiple formulas shown in FIG. 3 are one example relating to the second calculation method. For the first calculation method, the formulas illustrated in FIG. 3 are modified appropriately according to the sixth to tenth formulas from the formulas of the example relating to the second calculation method. As shown in FIG. 3, "t," "p," "a," and "T" are initialized (step S101). In one example, "t," "p," and "a" are set to 0. "T" is set to "T0." "T0" is one initial value. In FIG. 3, "$t_1$" corresponds to the final value of a time t. "dt" is the increase amount per step of the time t. "dp" is the increase amount per step of the parameter p.

In the example of FIG. 3, the processing between step S105 and step S106 corresponds to one loop. When "t" is smaller than "$t_1$," the "processing procedure" that includes the series of processing described below is repeated (step S105). For example, the "processing procedure" may be repeated when "p" is smaller than "P" that is preset appropriately. For example, the "processing procedure" includes the loop processing over "i" (step S301a and step S301b).

For example, a parameter ν is set to 0 (step S401).

In one loop processing (step S301a and step S301b), the ith entry of the first variable $x_i$ is updated (step S110). For example, in the first calculation method (the first calculating device) and the second calculation method (the second calculating device), the value that is obtained by adding dt*D*$y_i$ (referring to the tenth formula) to the first variable $x_i$ before the update is used as the first variable $x_i$ after the update. Here, "*" is the product symbol. The value that is obtained by adding dt*$y_i$ (referring to the eleventh formula) to the first variable $x_i$ before the update may be used as the first variable $x_i$ after the update.

The ith entry of the second variable $y_i$ is updated (step S120). In the example, step S121 and step S122 are performed.

In the first calculation method, step S121 corresponds to an update based on the first variable set {x}. On the other hand, in the second calculation method, step S121 corresponds to an update based on the first variable set {x} and the third variable set {z}. In the first calculation method and the second calculation method, step S122 corresponds to an update based on the first parameter set {J} and the first variable set {x}. The order of step S121 and step S122 is interchangeable.

At least a part of step S121 and at least a part of step S122 may be performed simultaneously. For example, step S121 corresponds to a first sub-update. Step S122 corresponds to a second sub-update. Step S121 is performed in the loop processing over "i" (step S301a and step S301b). Step S122 is performed in the loop processing over "i" (step S302a and step S302b).

In the first sub-update of the first calculation method, for example, the value that is obtained by adding dt*((p−D−$x_i$*$x_i$)*$x_i$−c*$h_i$*a) to the second variable $y_i$ before the update is used as the second variable $y_i$ after the update.

In the second sub-update of the first calculation method, for example, the value that is obtained by adding dt*c*Σ($J_{i,j}$*$x_j$) to the second variable $y_i$ before the update is used as the second variable $y_i$ after the update. "Σ" illustrates the sum over j. For example, "dt*c*J" may be used as the J matrix. In such a case, the arithmetic of "dt*c*" may not actually be performed.

On the other hand, in the first sub-update of the second calculation method, for example, the value that is obtained by adding dt*((p−D−$x_i$*$x_i$)*$x_i$−c*$h_i$*a−z*$y_i$) to the second variable $y_i$ before the update is used as the second variable $y_i$ after the update. For example, the second sub-update of the second calculation method may be similar to the second sub-update of the first calculation method.

In the second calculation method, the parameter ν is updated (step S402) inside one loop processing (step S301a and step S301b). In the update of the parameter ν, for example, the value that is obtained by adding $y_i$*$y_i$ to the parameter ν before the update is used as the parameter ν after the update.

For example, the third variable set {z} is updated when one loop processing (step S301a and step S301b) ends (the third variable update).

The third variable update (step S403) sets the third variable z after the update to be the value obtained by adding dt*r*(ν/N−T) to the third variable z before the third variable update. "dt*r*(ν/N−T)" corresponds to one example of the ith entry of the second element function. The variable of the second element function includes the difference between the first calculation parameter T(t) and the mean square of at least a part of the second variable set {y}. "T" of step S403 is one example of the first calculation parameter T(t).

Update processing of the parameters for the updating is performed (step S130). Namely, the value that is obtained by adding "dt" to "t" before the update is used as "t" after the update. The value that is obtained by adding "dp" to "p" before the update is used as "p" after the update. "a" is, for example, $p^{1/2}$. The value that is obtained by adding "−dT" to "T" before the update is used as "T" after the update (the update of the first calculation parameter T(t)). The update of "T" is performed in the second calculation method but is not performed in the first calculation method.

The flow returns to step S105 when "t" is smaller than "$t_i$" (step S106). For example, the flow may return to step S105 when "p" is smaller than "P" which is preset appropriately.

When "t" is not less than "$t_1$," the update ends; and the flow proceeds to step S220 or step S230 shown in FIG. 2.

Figure 4:
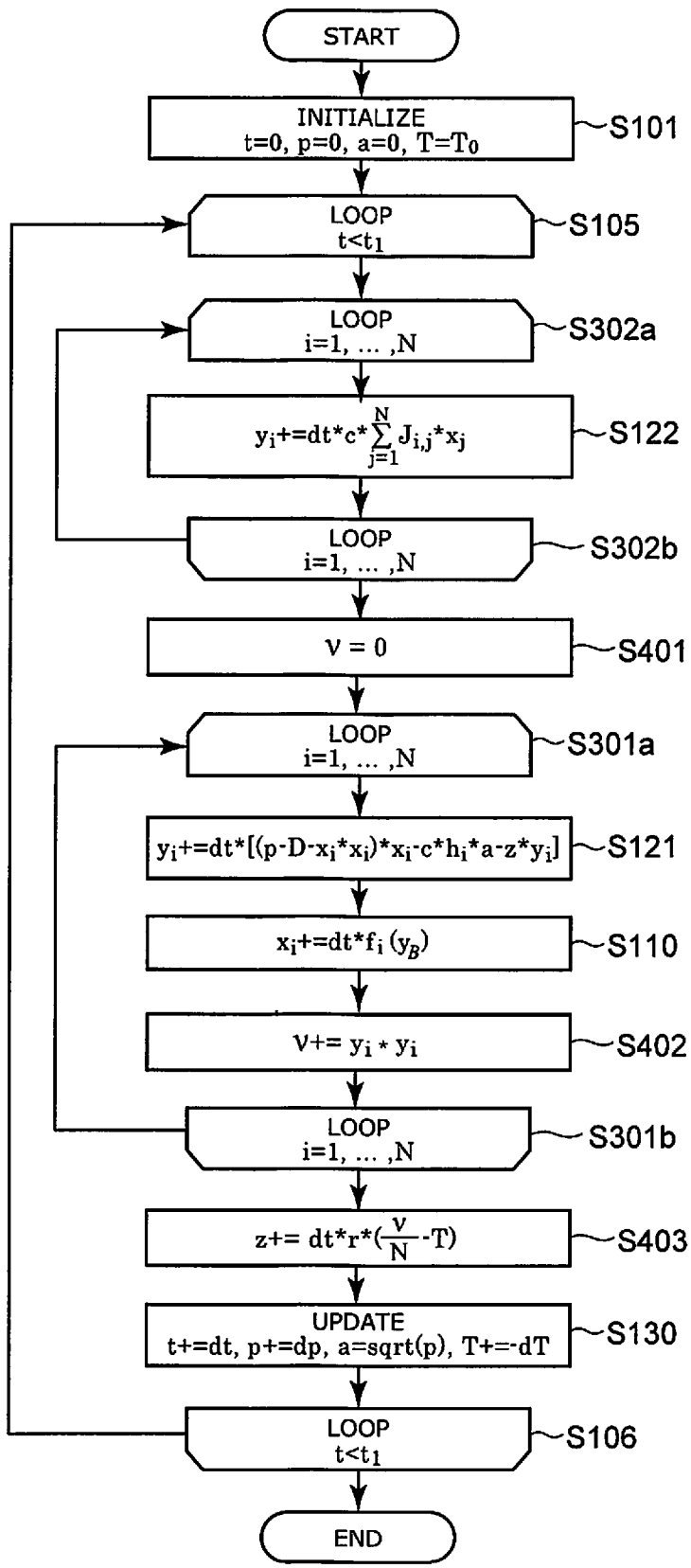
FIG. 4 is a flowchart illustrating a part of the operation of the calculating device according to the embodiment.

FIG. 4 is a flowchart illustrating a part of the operation of the calculating device according to the embodiment.

FIG. 4 illustrates step S210. In one repeated processing in the example shown in FIG. 4, step S120 (referring to FIG. 3) is performed before step S110. Thus, the order of step S110 and step S120 is arbitrary.

In one example, "K" is set to 1. For example, "N," "D," "c," "$t_1$," "dt," and "dp" can be preset to the appropriate values. "T0" can be preset to the appropriate value.

In the examples of FIG. 3 and FIG. 4, a linear increase is applied to the update of "p." In the embodiment, any increasing function may be used to update "p." The embodiment includes two types of update methods as recited above. Namely, in one update method, after the update of the first variable $x_i$, the second variable $y_i$ is updated using the updated first variable $x_i$. In another update method, after the update of the second variable $y_i$, the first variable $x_i$ is updated using the updated second variable $y_i$. These two methods correspond respectively to FIG. 3 and FIG. 4.

Thus, in the calculating device 110 according to the embodiment, the processor 20 (referring to FIG. 1) repeats the processing procedure (step S210: referring to FIG. 2). In the first calculation method, the processing procedure includes, for example, the first variable update (step S110) and the second variable update (step S121 and step S122). In the second calculation method, the processing procedure includes, for example, the first variable update (step S110), the second variable update (step S121 and step S122), and the third variable update (step S403).

In the first calculation method and the second calculation method, the first variable update includes updating the ith entry of the first variable $x_i$ by adding the ith entry of the first function to the ith entry of the first variable $x_i$ before the first variable update (i being an integer not less than 1 and not more than N, and N being an integer of 2 or more). The ith entry of the first variable $x_i$ is one of the first variable set $\{x\}$. The variable of the ith entry of the first function includes the ith entry of the second variable $y_i$. The ith entry of the second variable $y_i$ is one of the second variable set $\{y\}$. The ith entry of the first function is one of the first function set.

In the first calculation method, the second variable update includes updating the ith entry of the second variable $y_i$ by adding the ith entry of the second function and the ith entry of the third function to the ith entry of the second variable $y_i$ before the second variable update. The variable of the ith entry of the second function includes the ith entry of the first variable $x_i$. The variable of the ith entry of the third function includes at least a part of the first parameter set $\{J\}$ and at least a part of the first variable set $\{x\}$. The ith entry of the second function is one of the second function set. The ith entry of the third function is one of the third function set.

On the other hand, in the second calculation method, the second variable update includes updating the ith entry of the second variable $y_i$ by adding the arithmetic result of the ith entry of the second function, the ith entry of the third function, and the ith entry of the first element function to the ith entry of the second variable $y_i$ before the second variable update. The variable of the ith entry of the second function includes the ith entry of the first variable $x_i$. The variable of the ith entry of the third function includes at least a part of the first parameter set $\{J\}$ and at least a part of the first variable set $\{x\}$. The variable of the ith entry of the first element function includes the product of the ith entry of the second variable $y_i$ and the third variable z. The ith entry of the second function is one of the second function set. The ith entry of the third function is one of the third function set. The ith entry of the first element function is one of the first element function set.

In the second calculation method, the third variable update includes updating the third variable z by adding the ith entry of the second element function to the third variable z before the third variable update. The third variable z is one of the third variable set $\{z\}$. The variable of the second element function includes the difference between the first calculation parameter T(t) and the mean square of at least a part of the second variable set $\{y\}$.

Then, the processor 20 outputs at least one of the ith entry of the first variable $x_1$ obtained after repeating the processing procedure or a function of the ith entry of the first variable $x_i$ obtained after repeating the processing procedure which are recited above. For example, at least one of any first variable included in the first variable set $\{x\}$ or a function of any first variable obtained after repeating the processing procedure is output. For example, at least one of all of the first variables included in the first variable set $\{x\}$ or each function of all of the first variables obtained after repeating the processing procedure may be output.

In the first calculation method and the second calculation method, the first function (the first function set) recited above is independent of the first variable set $\{x\}$. The value of the result of the first function (the first function set) does not change even when the value of the first variable set $\{x\}$ is modified. In the first calculation method, the second function (the second function set) recited above is independent of the second variable set $\{y\}$. The value of the result of the second function (the second function set) does not change even when the value of the second variable set $\{y\}$ is modified. In the first calculation method and the second calculation method, the third function (the third function set) recited above is independent of the second variable set $\{y\}$. The value of the result of the third function (the third function set) does not change even when the value of the second variable set $\{y\}$ is modified.

In the first calculation method (the first calculating device) and the second calculation method (the second calculating device), the ith entry of the first function is, for example, $dt*D*y_i$ (e.g., referring to the tenth formula). The ith entry of the first function may be, for example, $dt*y_i$ (e.g., referring to the eleventh formula).

In the first calculation method (the first calculating device), the second function is, for example, $dt*((p-D-x_i*x_i)*x_i-c*h_i*a)$. The third function is, for example, $dt*c*Z(J_{i,j}*x_j)$.

In the second calculation method (the second calculating device), the second function is, for example, $dt*((p-D-x_i*x_i)*x_i-c*h_i*a)$. The third function is, for example, $dt*c*\Sigma(J_{i,j}*x_j)$. The first element function is, for example, $dt*(-z*y_i)$. In the second calculation method (the second calculating device), the second element function is, for example, "$dt*r*(v/N-T)$."

In the embodiment, the order of the first variable update, the second variable update, and the third variable update is mutually interchangeable in one of the processing procedures recited above performed repeatedly.

The algorithm that is performed by the calculating device according to the embodiment includes, for example, the following.

For example, the matrix J (one example of the first parameter set $\{J\}$) is acquired. Or, the matrix J is determined by a calculation. The matrix J is, for example, a parameter of an Ising model. At this time, the vector h (one example of the second parameter set $\{h\}$) also may be acquired. Or, the vector h may be determined by a calculation.

In the first calculation method, two types of variables (the first variable set $\{x\}$ and the second variable set $\{y\}$) are used. The update of one of the variables uses the value of the other variable. The value of the one of the variables is not used in the update of the one of the variables. After the update of the one of the variables, the other variable is updated using the value of the one of the variables after the update.

In the second calculation method, three types of variables (the first variable set $\{x\}$, the second variable set $\{y\}$, and the third variable set $\{z\}$) are used.

The second function recited above includes, for example, a fourth function which is a nonlinear function of the ith entry of the first variable $x_i$. The fourth function also includes an operation parameter "p." "p" changes with the update of the multiple types of variables.

The number of real roots of the fourth function recited above changes when "p" changes with the update of the multiple types of variables. The "real root of the function"

is the value (the real number) of a variable for which the value of the function is zero. In the second variable update, in the case where only the fourth function is considered, the real roots of the fourth function correspond to fixed points of a nonlinear dynamical system. (In a Hamiltonian dynamical system, the fixed points correspond to extreme values of the Hamiltonian). Therefore, a change of the number of real roots of the fourth function corresponds to a change of the number of fixed points. This corresponds to bifurcation phenomena in the nonlinear dynamical system. In the algorithm used in the calculating device according to the embodiment, the initial values of the variables are set to be near one initial stable fixed point. Bifurcations are caused by changing "p." The multiple stable fixed points after the bifurcation (the values of the variables change toward the vicinity of one of the multiple stable fixed points) and the discrete variables of the combinatorial optimization to be solved are caused to correspond. Thereby, the combinatorial optimization problem is solved using the bifurcation phenomenon. For example, in the example recited above, each x value at the stable fixed points after the bifurcation is the two values of positive and negative; and the sign of each x value is associated with the Ising spins (the discrete variables of the Ising problem). Because the initial stable fixed point is the origin, the initial value of each x and the initial value of each y are set to values near the origin (that is, small random numbers having absolute values of 0.1 or less).

The fourth function is, for example, $dt*(p-D'-x_i*x_i)*x_i$. "D" is an appropriate constant satisfying $0 \leq D' \leq D$. At the initial time, $p=0$; and $x_i=0$ is the only root of the fourth function; but when p becomes larger than D', there are three roots; and the two roots of positive and negative are associated with the Ising spins. For example, in the case where the second function is set to $dt*((p-D-x_i*x_i)*x_i-c*h_i*a)$, the second function can be expressed as the sum of the fourth function and a linear function, e.g., $dt*(p-D'-x_i*x_i)*x_i+dt*(-(D-D')*x_i-c*h_i*a)$. Accordingly, the second function includes the fourth function.

The fourth function recited above is, for example, a cubic function. For example, the calculations are easier by such processing than by calculations using a nonlinear function (e.g., a sigmoid function) used in a neural network.

In the embodiment, the calculations become faster by increasing the time step (e.g., "dt"). On the other hand, the calculations become unstable when the time step is increased excessively. By considering this, the time step may be increased in a part of the calculations; and the time step may be reduced in another part of the calculations. For example, a large time step is applicable to the update including the product-sum operation of the matrix J and the first variable x having the large calculation amount. A small time step is applicable to the other updates. Thereby, even faster speeds are possible.

Examples in the case where such a calculation is performed will now be described.

Figure 5:
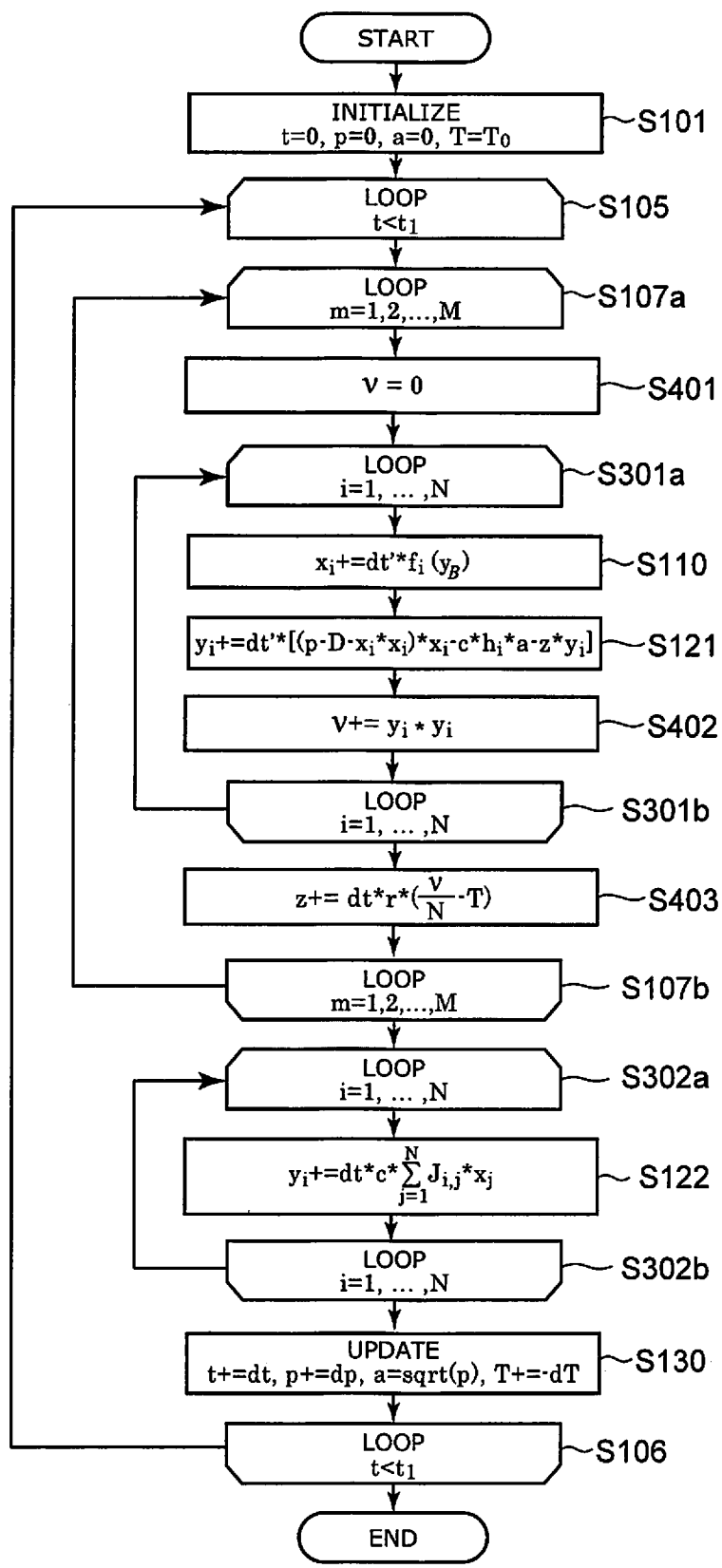
FIG. 5 is a flowchart illustrating a part of the operation of the calculating device according to the embodiment.

FIG. 5 is a flowchart illustrating a part of the operation of the calculating device according to the embodiment.

FIG. 5 illustrates step S210. In the example shown in FIG. 5, a small loop (step S107a to step S107b) is provided inside one "processing procedure" (the group of the processing between step S105 and step S106). In step S107a, the loop variable "m" is not less than 1 and not more than M. For example, M is an integer of 2 or more. Step S110 and step S121 are repeated M times inside the small loop. The order of step S110 and step S121 is interchangeable. Subsequently, the flow proceeds to step S122.

In the example of FIG. 5 in the first calculation method, step S122 is performed after step S110 and step S121 are repeated. In the example of FIG. 5 in the second calculation method, step S122 is performed after step S110, step S121, and step S403 are repeated.

Figure 6:
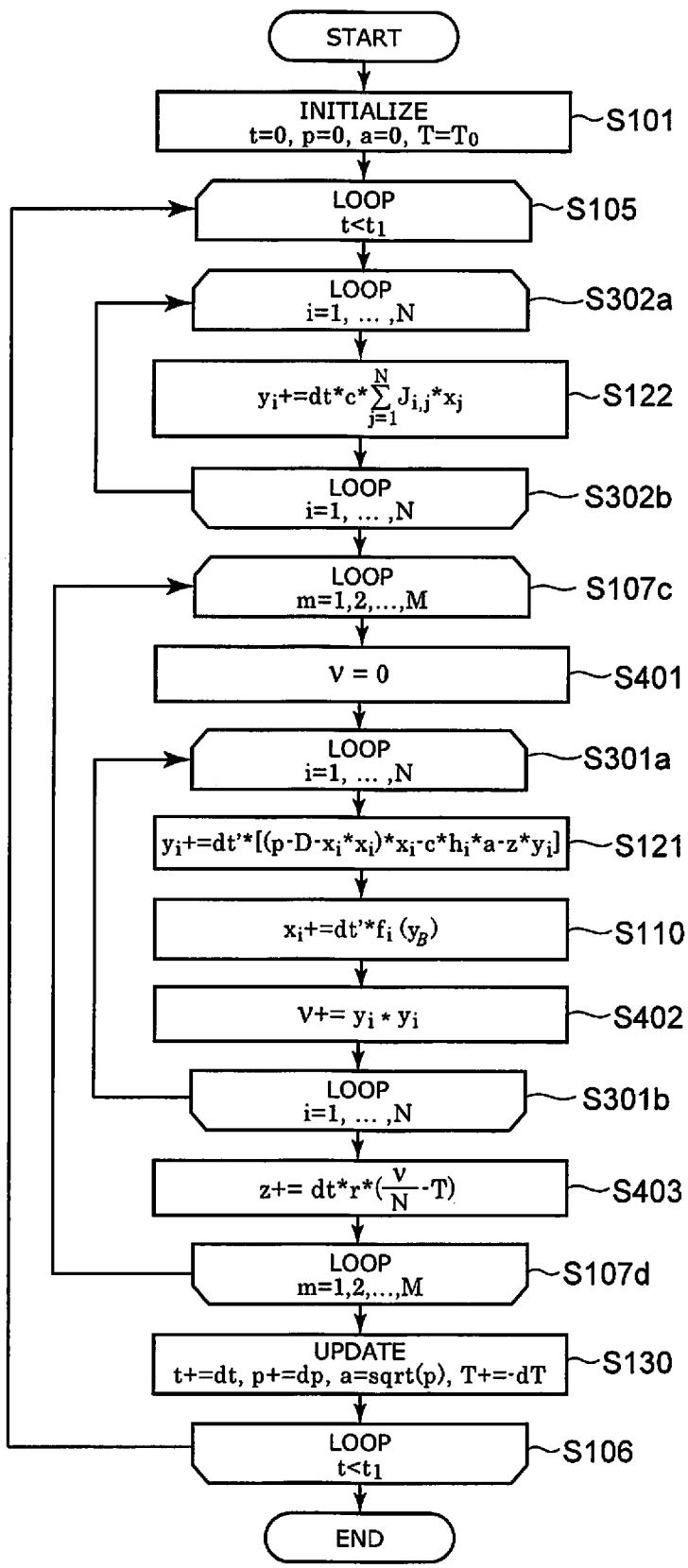
FIG. 6 is a flowchart illustrating a part of the operation of the calculating device according to the embodiment.
Figure 7:
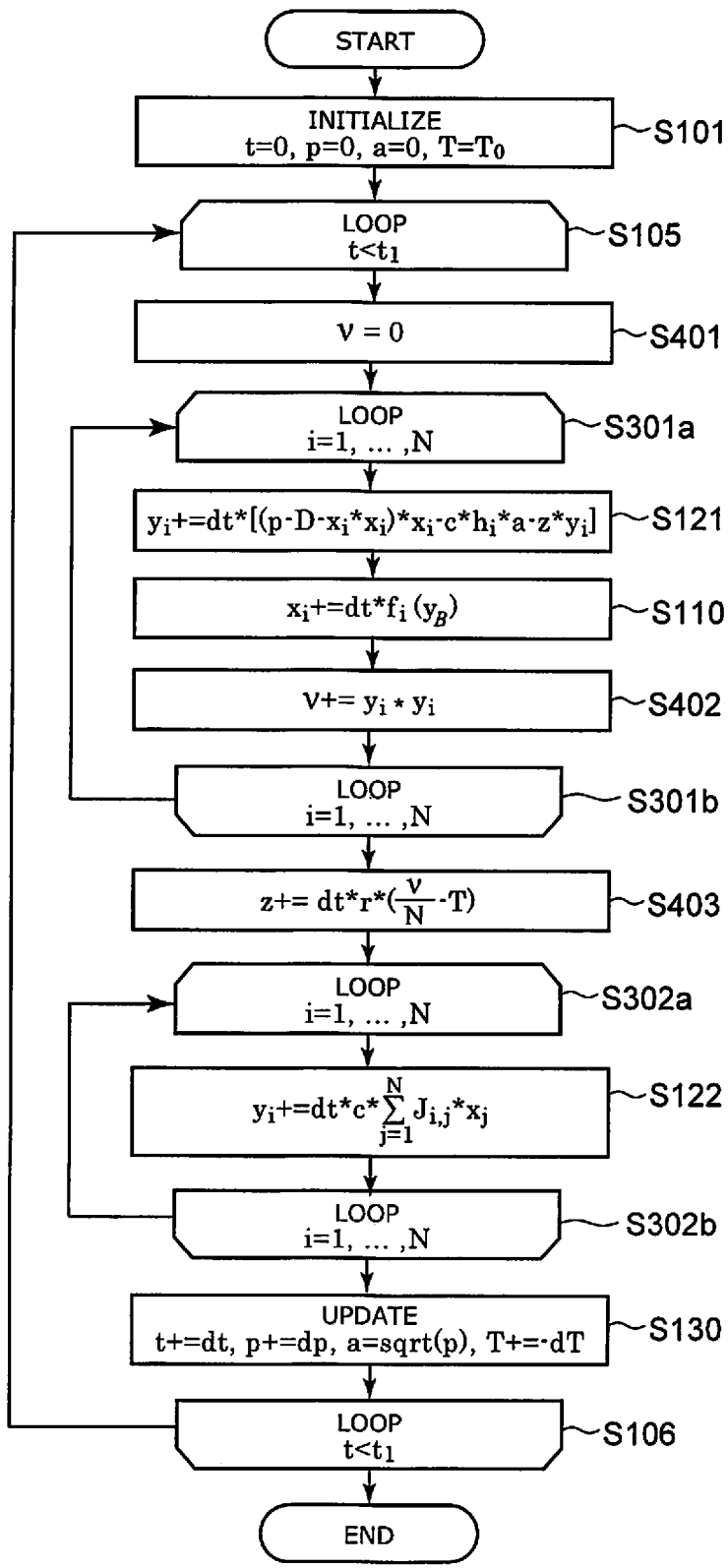
FIG. 7 is a flowchart illustrating a part of the operation of the calculating device according to the embodiment.
Figure 8:
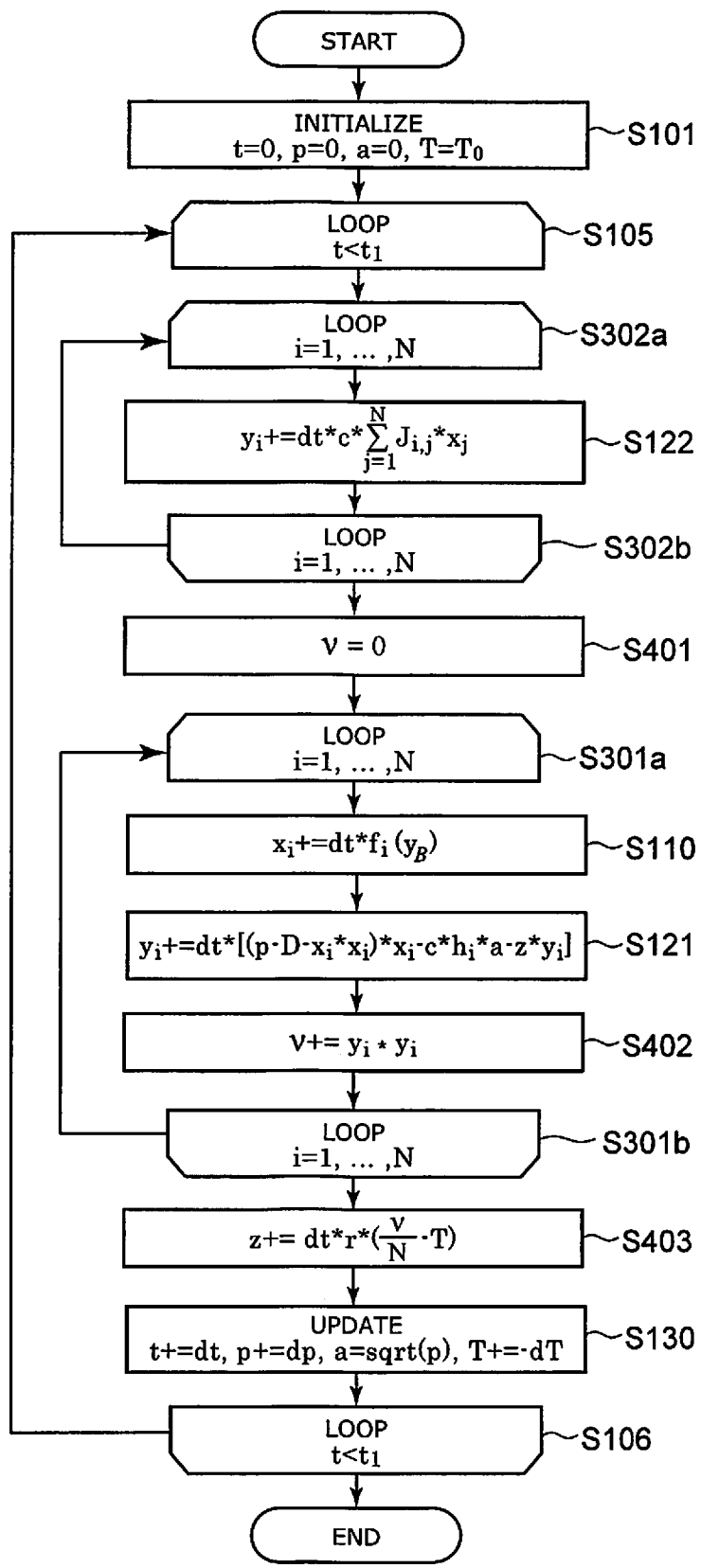
FIG. 8 is a flowchart illustrating a part of the operation of the calculating device according to the embodiment.
Figure 9:
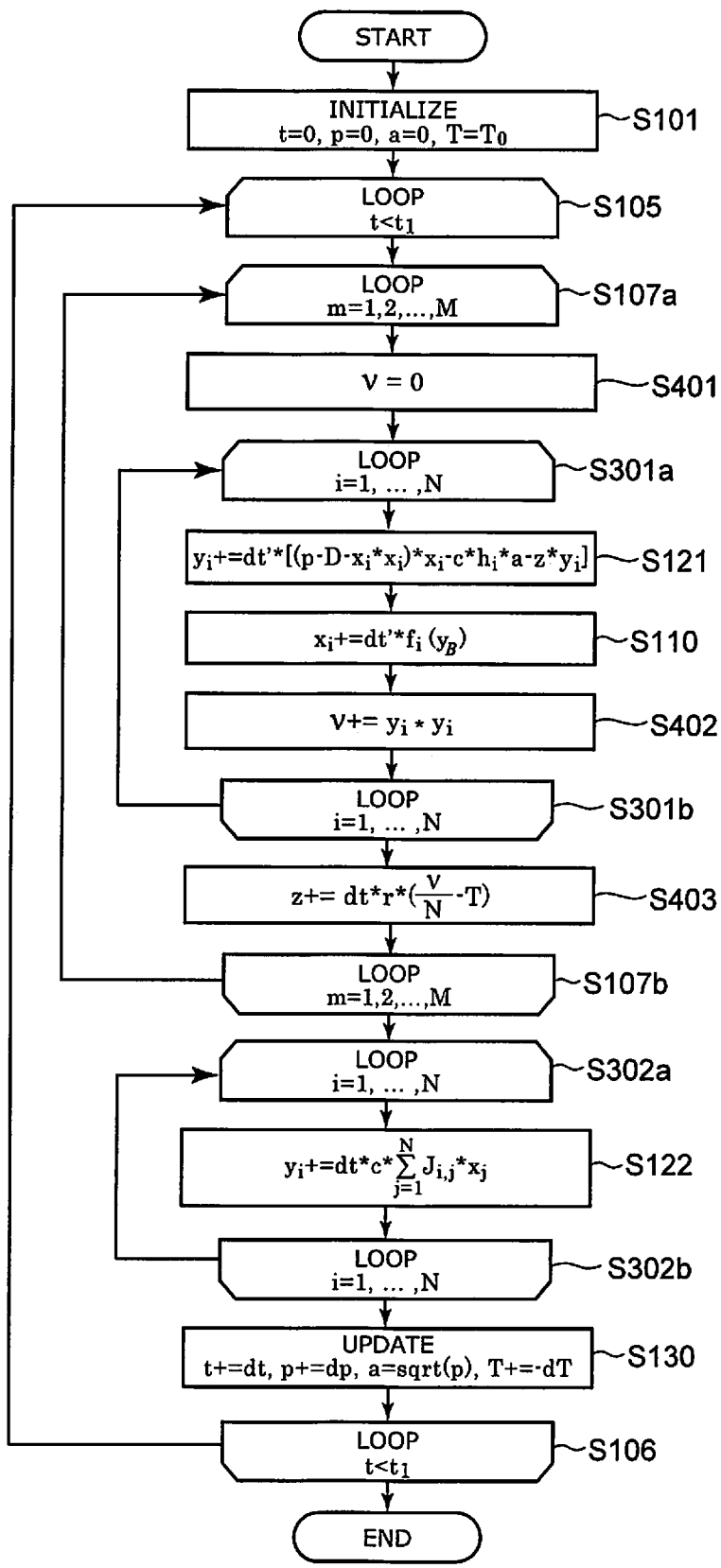
FIG. 9 is a flowchart illustrating a part of the operation of the calculating device according to the embodiment.
Figure 10:
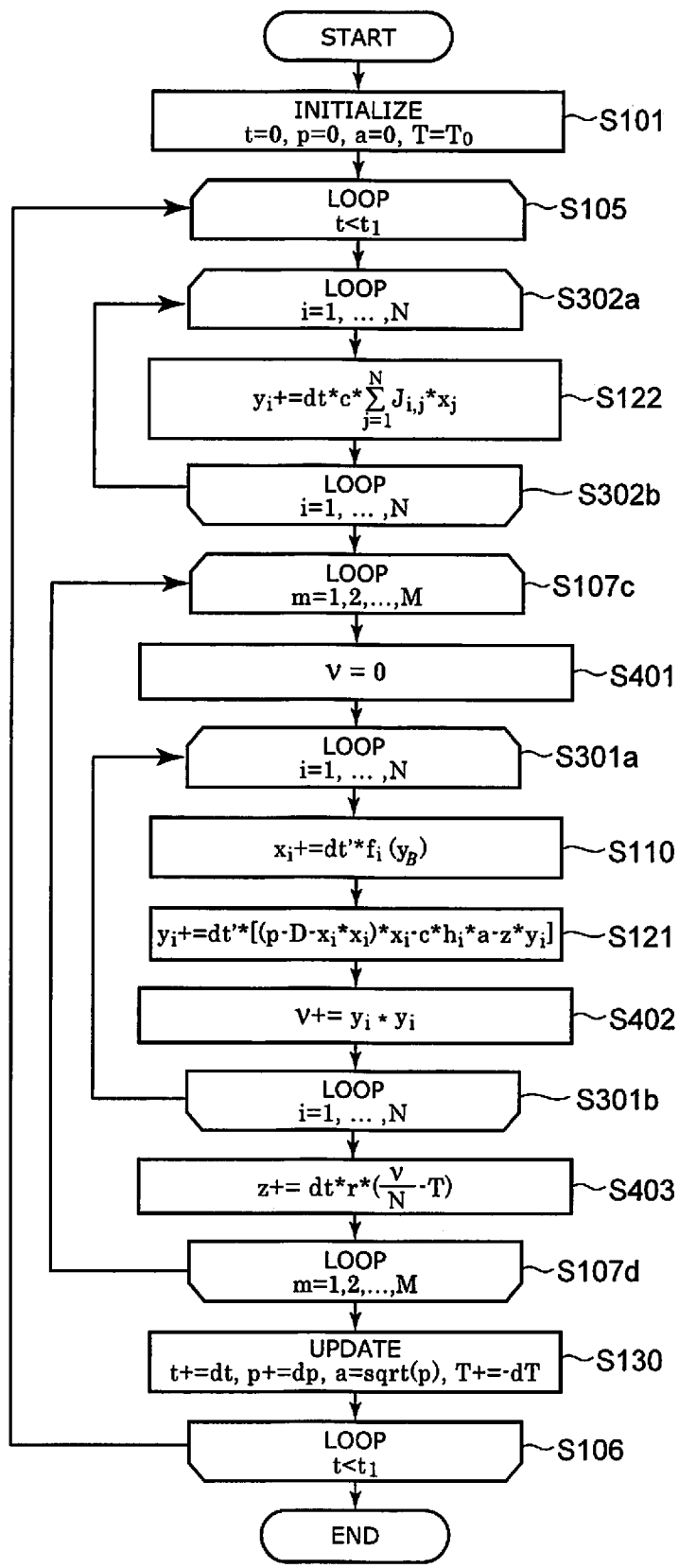
FIG. 10 is a flowchart illustrating a part of the operation of the calculating device according to the embodiment.

FIG. 6 is a flowchart illustrating a part of the operation of the calculating device according to the embodiment.

FIG. 6 illustrates step S210. In the example shown in FIG. 6 as well, a small loop (step S107c to step S107d) is provided inside one loop (step S105 to step S106). In step S107c, the loop variable "m" is not less than 1 and not more than M. The small loop is performed after step S122 is performed. In the first calculation method, the small loop corresponds to repeating step S121 and step S110. In the second calculation method, the small loop corresponds to repeating step S121, step S110, and step S403. Step S121 and step S110 are repeated M times inside the small loop; or step S121, step S110, and step S403 are repeated M times inside the small loop. The order of step S121 and step S110 is interchangeable. The order of step S121, step S110, and step S403 is interchangeable.

In the example of FIG. 5, the update of the second variable $y_i$ is performed after the update of the first variable $x_i$. In the example of FIG. 6, the update of the first variable $x_i$ is performed after the update of the second variable $y_i$. For example, the time step "dt" of the update not including the product-sum operation relating to the matrix J is set to "dt/M." On the other hand, in one update (the large loop) including the product-sum operation relating to the matrix J, the small loop (the update not including the product-sum operation relating to the matrix J) is performed M times. By the flow recited above, for example, the time step dt of the large loop can be set to a relatively large value. For example, a high-speed calculation is possible.

Thus, in one example of the embodiment, the second variable update (step S120) recited above includes the first sub-update (step S121) and the second sub-update (step S122).

The first sub-update (step S121) includes updating the ith entry of the second variable $y_i$ by adding the second function to the ith entry of the second variable $y_i$ before the first sub-update. The second sub-update (step S122) includes updating the ith entry of the second variable $y_i$ by adding the third function to the ith entry of the second variable $y_i$ before the second sub-update. Even in such a case, the second function is independent of the second variable set $\{y\}$. The third function is independent of the second variable set $\{y\}$.

In the first calculation method, for example, the second sub-update is performed after alternately performing the first variable update and the first sub-update M times (M being an integer of 2 or more). Or, the first variable update and the first sub-update are performed alternately M times after the second sub-update. The order of performing the first variable update and the first sub-update alternately is interchangeable.

In the second calculation method, for example, the second sub-update is performed after performing the first variable update, the first sub-update, and the third variable update M times (M being an integer of 2 or more). Or, the first variable update, the first sub-update, and the third variable update are performed M times after the second sub-update. The order of the first variable update, the first sub-update, and the third variable update is interchangeable.

In the second calculation method, at least a part of the third variable update (step S403) may be performed simultaneously with at least a part of the second sub-update (step S122).

The third function includes, for example, the product-sum operation of the at least a part of the first parameter set $\{J\}$ recited above and the at least a part of the first variable set $\{x\}$ recited above.

In one example, the number of real roots of the fourth function after repeating the processing procedure recited above is 2 or more. One of the roots of the fourth function after repeating the processing procedure is positive. Another one of the roots of the fourth function after repeating the processing procedure is negative. For example, the processor 20 (referring to FIG. 1) outputs the sign (i.e., ±1) of the ith entry of the first variable $x_i$ obtained after repeating the processing procedure.

As described above, the second function may include an ith entry of a second parameter $h_i$. The ith entry of the second parameter $h_i$ is one of the second parameter set $\{h\}$.

In the embodiment, the processor 20 reads the data stored in the storer 10, updates the data, and stores the updated data in the storer 10.

For example, the first variable update (step S110) includes acquiring, from the storer 10, the ith entry of the first variable $x_i$ before the first variable update, and storing, in the storer 10, the ith entry of the first variable $x_i$ after the first variable update. The second variable update (step S120) includes acquiring, from the storer 10, the ith entry of the second variable $y_i$ before the second variable update, and storing, in the storer 10, the ith entry of the second variable $y_i$ after the second variable update. The third variable update (step S403) includes acquiring, from the storer 10, the third variable z before the third variable update, and storing, in the storer 10, the third variable z after the third variable update.

For example, the first variable update may further include acquiring the ith entry of the second variable $y_i$ from the storer 10, calculating the ith entry of the first function, and updating the ith entry of the first variable $x_i$ by adding the ith entry of the first function to the ith entry of the first variable $x_i$.

For example, the second variable update may further include acquiring the ith entry of the first variable $x_i$ from the storer 10, calculating the second function, acquiring, from the storer 10, the at least a part of the first parameter set $\{J\}$ recited above and the at least a part of the first variable set $\{x\}$ recited above, calculating the third function, and updating the ith entry of the second variable $y_i$ by adding the second function and the third function to the ith entry of the second variable $y_i$.

For example, the second variable update may include acquiring the ith entry of the first variable $x_i$ from the storer 10, calculating the second function, acquiring, from the storer 10, the at least a part of the first parameter set $\{J\}$ recited above and the at least a part of the first variable set $\{x\}$ recited above, calculating the third function, acquiring the ith entry of the second variable $y_i$ from the storer 10, and calculating the first element function. For example, the second variable update may include updating the ith entry of the second variable $y_i$ by adding the arithmetic result of the second function, the third function, and the first element function to the ith entry of the second variable $y_i$.

In the embodiment, for example, in the case where the matrix J is a sparse matrix, a sparse matrix compression format may be used. For example, the COO (coordinate) format, the CSR (compressed sparse row) format, or the like is applicable to the sparse matrix compression format. For example, the memory size can be conserved by using the sparse matrix compression format. For example, the product-sum operation of the matrix J and the first variable x can be performed quickly by using the sparse matrix compression format.

Examples of the constant "c" will now be described. For example, the detuning "D" is set to be larger than c times a maximum eigenvalue $\lambda$max of the matrix J (e.g., referring to Non-Patent Literature 2). In the case where "D" is too large, unnecessary calculation time occurs. Therefore, for example, "D" is set to be substantially equal to c times $\lambda$max. In such a case, c=D/$\lambda$max. On the other hand, in one example, the matrix J is a real symmetric matrix. In such a case, $\lambda$max is substantially the same as $2\sigma \times N^{1/2}$ when the size of the matrix J is sufficiently large. This relationship is based on the Wigner semicircle distribution of a random matrix. "$\sigma$" is the standard deviation of the nondiagonal entries of the matrix J. In such a case, it is sufficient to set c=D/($2\sigma \times N^{1/2}$). Calculation examples in such a case are described below.

As a method for increasing the accuracy in the embodiment, it is considered that the function used as the nonlinear function recited above can be modified. For example, in the first calculation method and the second calculation method, the functions described in reference to the ninth to thirteenth formulas recited above can be used appropriately. The following fourteenth formula may be used instead of the eighth formula.

$$\frac{dy_i}{dt} = \{[-D + p(t)](1 + x_i^n) - Kx_i^{n+2}\}x_i - ch_i a(t) + c\sum_{j=1}^{N} J_{i,j}x_j \qquad (14)$$

In the fourteenth formula, "n" is an even number of 2 or more. By using such a function, for example, the accuracy of the solution of the Ising problem can be increased.

The algorithm recited above that is performed by the calculating device 110 according to the embodiment can be performed using various configurations. The calculating device 110 may include, for example, a PC cluster. The calculating device 110 may include, for example, a GPU (Graphics Processing Unit). The calculating device 110 may include, for example, a dedicated circuit. The dedicated circuit may include, for example, at least one of a FPGA (field-programmable gate array), a gate array, or an ASIC (application specific integrated circuit). The calculating device 110 may include, for example, a parallel digital calculating device.

FIG. 7 to FIG. 10 are flowcharts illustrating a part of the operation of the calculating device according to the embodiment.

These figures show other examples of step S210. As shown in these figures, step S110 and step S121 of the examples of FIG. 3 to FIG. 6 may be interchanged with each other.

Figure 11:
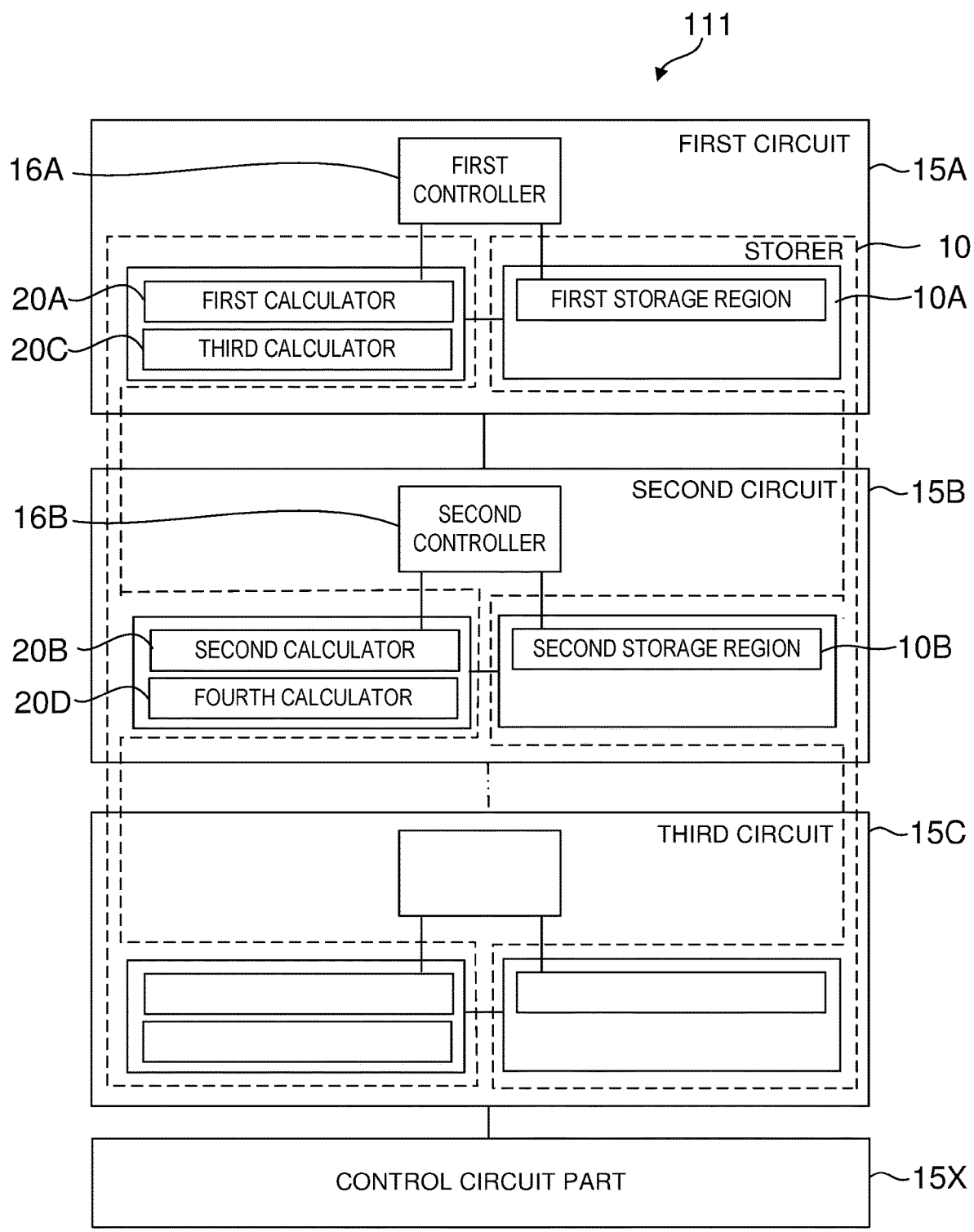
FIG. 11 is a schematic view showing an example of a calculating device according to the embodiment.

FIG. 11 is a schematic view showing an example of a calculating device according to the embodiment.

As shown in FIG. 11, the calculating device 111 according to the embodiment includes multiple circuits (a first circuit 15A, a second circuit 15B, a third circuit 15C, etc.). Each of these multiple circuits is, for example, one computer. Each of these multiple circuits may be, for example, one semiconductor circuit. These multiple circuits can communicate (e.g., transmit and receive data) with one another. A control circuit part 15X is further provided in the calculating device 111. The communication of the multiple circuits is controlled by the control circuit part 15X.

For example, a processor and a storer (memory) are provided in each of the multiple circuits. A controller also may be provided.

Parallel computations are performed by the multiple circuits (the first circuit 15A, the second circuit 15B, the third circuit 15C, etc.). The number of the multiple circuits is arbitrary.

For example, a first calculator 20A and a first storage region 10A are provided in the first circuit 15A. In the example, the first circuit 15A further includes a first controller 16A. A second calculator 20B and a second storage region 10B are provided in the second circuit 15B. In the example, the second circuit 15B further includes a second controller 16B. Such a configuration is provided also in the third circuit 15C.

The processor 20 includes the multiple calculators (the first calculator 20A, the second calculator 20B, etc.) recited above. For example, the first calculator 20A performs a part of the calculation of the third function (e.g., a part of the loop over i of step S302a, step S122, and step S302b). The second calculator 20B performs another part of the calculation of the third function (e.g., another part of the loop over i of step S302a, step S122, and step S302b). At least a part of these calculations is performed in parallel. For example, at least a part of performing the part of the calculation of the third function recited above in the first calculator 20A and at least a part of performing the other part of the calculation of the third function in the second calculator 20B are performed simultaneously. The speed of the calculations can be increased by the parallel computation. The calculation amount of the third function is high. Therefore, higher speeds are realized effectively by parallelization of the calculation of the third function (e.g., the loop over i of step S302a, step S122, and step S302b).

In the parallel computation, for example, the first calculator 20A stores, in the first storage region 10A, a part of the first parameter set $\{J\}$ that is necessary for performing the part of the calculation of the third function. Thus, the processing and storing necessary for the part of the calculation of the third function are performed inside the first circuit 15A. On the other hand, the second calculator 20B stores, in the second storage region 10B, another part of the first parameter set $\{J\}$ that is necessary for performing the other part of the calculation of the third function. Thus, the processing and storing necessary for the other part of the calculation of the third function are performed inside the second circuit 15B.

For example, the first parameter set $\{J\}$ includes a first-calculation-used part and a second-calculation-used part. The first-calculation-used part is used in the part of the calculation of the third function. The second-calculation-used part is used in the other part of the calculation of the third function. The first calculator 20A stores the first-calculation-used part recited above in the first storage region 10A. The second calculator 20B stores the second-calculation-used part recited above in the second storage region 10B.

In the embodiment, the first variable update of the ith entry of the first variable $x_i$ and the first sub-update (the update using the second function) of the ith entry of the second variable $y_i$ may be a parallel computation with the first variable update of a jth entry of the first variable x; ("j" being different from "i") and the first sub-update (the update using the second function) of a jth entry of the second variable $y_j$. In such a case, a third calculator 20C and a fourth calculator 20D may be provided in the processor 20. The third calculator 20C is provided in the first circuit 15A. The fourth calculator 20D is provided in the second circuit 15B. These calculators are functional blocks. The processing that is performed by at least a part of the third calculator 20C may be performed by at least a part of the first calculator 20A.

The processing that is performed by at least a part of the fourth calculator 20D may be performed by at least a part of the second calculator 20B.

For example, the third calculator 20C performs a part of the calculation of the first variable update and a part of the calculation (the first sub-update) of the second function. The fourth calculator 20D performs another part of the calculation of the first variable update and another part of the calculation (the first sub-update) of the second function.

As described above, the first variable update includes updating the ith entry of the first variable $x_i$ by adding the ith entry of the first function to the ith entry of the first variable $x_i$ before the first variable update. Similarly, the first variable update further includes updating the jth entry of the first variable $x_i$ by adding a jth entry of the first function to the jth entry of the first variable $x_i$ before the first variable update U being different from i, and being an integer not less than 1 and not more than N). Here, the jth entry of the first variable $x_i$ is one of the first variable set $\{x\}$. The variable of the jth entry of the first function includes the jth entry of the second variable $y_i$. The jth entry of the second variable $y_j$ is one of the second variable set $\{y\}$.

For example, a part of the calculation of the first variable update includes the calculation of the update of the ith entry of the first variable $x_i$. Another part of the calculation of the first variable update includes the calculation of the update of the jth entry of the first variable $x_j$.

On the other hand, a part of the calculation of the second function includes the calculation of the second function having the ith entry of the first variable $x_i$ as a variable. Another part of the calculation of the second function includes the calculation of the second function having the jth entry of the first variable $x_j$ as a variable.

At least a part of performing a part of the calculation of the first variable update and a part of the calculation (the first sub-update) of the second function (e.g., a part of the i loop between step S301a and step S301b in the flowcharts of FIGS. 3 to 10) in the third calculator 20C and at least a part of performing another part of the calculation of the first variable update (e.g., another part of the i loop between step S301a and step S301b in the flowcharts of FIGS. 3 to 10) and another part of the calculation (the first sub-update) of the second function in the fourth calculator 20D may be performed simultaneously.

The calculations can be fast by using such a parallel computation.

In the second calculation method (the second calculating device), the mean square of the thirteenth formula is used as the mean square of the second variable y corresponding to the first variable x updated in the "part of the calculation of the first variable update" recited above. Thereby, for example, in the "parallel computation," communication of the second variable y is unnecessary between the "other part of the calculation of the first variable update" and the "part of the calculation of the first variable update" for calculating the mean square. Higher speeds are easier due to the parallel computation. The partial set "$S_i$" is defined so that the parallel computation is possible.

For example, one part of the processor 20 performs the update of a part of the second variable set $\{y\}$ and the calculation of the mean square relating to the part of the second variable set $\{y\}$. In such a case, the part of the second variable set {y} recited above corresponds to one of the multiple partial sets recited above (e.g., "$S_i$"). Another one part of the processor 20 performs the update of another part of the second variable set {y} and the calculation of the mean square relating to the other part of the second variable set {y}. In such a case, the other part of the second variable set {y} recited above corresponds to another one of the multiple partial sets recited above (e.g., "$S_k$"). For example, the mean square that is calculated by the one part of the processor 20 recited above is used to update the part of the second variable set {y} recited above. For example, the mean square that is calculated by the other one part of the processor 20 recited above is used to update the other part of the second variable set {y} recited above.

Because the update of a part of the second variable set {y} and the calculation of the mean square of the part are performed by a part of the processor 20, the communication (the transfer of data) is efficient. Or, the communication is unnecessary.

For example, at least a part of performing the update of the part of the second variable set {y} recited above and the calculation of the mean square (or the variance value) relating to the part of the second variable set {y} recited above and at least a part of performing the update of the other part of the second variable set {y} recited above and the calculation of the mean square (or the variance value) relating to the other part of the second variable set {y} recited above are performed simultaneously. The processing time can be shortened by the parallel computation.

For example, one part of the processor 20 performs the update of a part of the second variable set {y} (a first update), the calculation of the mean square relating to a part of the second variable set {y} (a first calculation), and the update of one third variable z included in the third variable set {z} (a second update). The second update is performed using the calculated mean square. Another one part of the processor 20 performs the update of another part of the second variable set {y} (a third update), the calculation of the mean square relating to another part of the second variable set {y} (a second calculation), and the update of another one third variable z included in the third variable set {z} (a fourth update). The fourth update is performed using the mean square relating to the calculated other part recited above.

For example, at least a part of performing the first update, the first calculation, and the second update may be performed simultaneously with at least a part of performing the third update, the second calculation, and the fourth update.

Calculation examples of the calculating device according to the embodiment will now be described. In the following calculation examples, the calculation time does not include the time of setting the parameters. The calculation time corresponds to the time necessary to solve the differential equation after setting the parameters.

In a first calculation example, the calculations are performed by a PC cluster. In the first calculation example, the variables and the parameters are treated as "floating" (32-bit floating-point numbers). The number of computing cores is taken as "Q." "Q" is the divisor of N. It is taken that L=N/Q.

A MPI (Message Passing Interface) is used when calculating the algorithm recited above in parallel using the PC cluster. The MPI corresponds to distributed memory parallel computing. In the MPI, each of the multiple computing cores processes one combination of L first split variables (x) and L second split variables (y).

For example, the ith computing core stores and performs the updates of $\{x_n|n=(i-1)L+1, \ldots, iL\}$ and $\{y_n|n=(i-1)L+1, \ldots, iL\}$.

The ith computing core also can store $\{h_n|n=(i-1)L+1, \ldots, iL\}$ and $\{J_{m,n}|m=(i-1)L+1, \ldots, iL; n=1, \ldots, N\}$. The update of $\{y_n|n=(i-1)L+1, \ldots, iL\}$ uses $\{h_n|n=(i-1)L+1, \ldots, iL\}$ and $\{J_{m,n}|m=(i-1)L+1, iL; n=1, \ldots, N\}$.

For example, all entries of $\{x_n|n=1, \ldots, N\}$ are used in the update of each of $\{y_n|n=(i-1)L+1, \ldots, iL\}$. For example, the information of $\{x_n|n=1, \ldots, N\}$ is supplied to all of the computing cores by an Allgather function. In other words, the information (the data) is shared.

In the embodiment, communication is performed between the multiple computing cores. In other words, the transmission and reception of the data is performed. The communication relating to $\{y_n|n=(i-1)L+1, \ldots, iL\}$ and the communication relating to $\{J_{m,n}|m=(i-1)L+1, \ldots, iL; n=1, \ldots, N\}$ are unnecessary.

In the second calculation method (the second calculating device), the ith computing core uses the mean square of $\{y_n|n=(i-1)L+1, \ldots, iL\}$ as the mean square of the second variable y of the thirteenth formula that is necessary for the update of $\{z_n|n=(i-1)L+1, \ldots, iL\}$. Thereby, the communication of the second variable y between the cores for calculating the mean square of the second variable y is unnecessary.

For example, a method may be considered in which the product-sum operation of the first parameter set {J} and the first variable set {x} is split and performed in parallel without performing the communication relating to the first variable set {x}; the results are communicated; and the update of the second variable set {y} is performed. In this method, the product-sum operation of the first parameter set {J} and the first variable set {x} is split and performed.

Examples of calculations in the case where N=2000 (the first calculation example) and the case where N=100000 (a second calculation example) will now be described.

As the first calculation example (the case of N=2000), the calculation example of a "$K_{2000}$" problem (referring to Non-Patent Literature 1) will be described. The "$K_{2000}$" problem is a fully-connected Ising model in which N=2000. The nondiagonal entries of the matrix J are one of ±1. The entries of the vector h all are zero. Accordingly, the calculations of the terms including the vector h are not performed. In such a case, the standard deviation σ of the nondiagonal entries of the matrix J is 1. Therefore, "c" is set to $c_0$=D/($2N^{1/2}$). The actual maximum eigenvalue of the matrix J in the "$K_{2000}$" problem is 88.813324. On the other hand, the theoretical value of random matrix theory is $2\sigma/N^{1/2}$=89.442719; and these values are extremely near each other.

In the first calculation example described below, Q=25; dp*($t_1$/dt)=D=2; and $t_1$=50.

In the first calculation method according to the embodiment (the first calculating device, the eighth formula, and the tenth formula), in the case where M=1 and dt=0.25, the calculation time is 7.6 ms. The average value of the Ising energy obtained at this time for 100 times is about −66086. This value is 32523 when converted into the "cut number" (referring to the fifteenth formula, the sixteenth formula, and Non-Patent Literature 1). A large "cut number" corresponds to a high accuracy. The cut number Nmc is represented by the following sixteenth and seventeenth formulas.

$$Nmc = \frac{Nmc0 - E_{Ising}}{2} \quad (15)$$

$$Nmc0 = -\frac{1}{2}\sum_{i=1}^{N}\sum_{j=1}^{N} J_{i,j} \quad (16)$$

In the first calculation method according to the embodiment (the first calculating device, the eighth formula, and the tenth formula), in the case where M=5 and dt=0.5, the calculation time is 4.1 ms. The average value of the Ising energy obtained at this time for 100 times is about −66137. This value converted into the "cut number" is 32549. In the case of M=5, "dt" can be 2 times "dt" in the case of M=1. The calculation time in the case of M=5 is about half of the calculation time in the case of M=1. High-speed calculations are possible.

On the other hand, according to Non-Patent Literature 1, the average value of the "cut number" for 0.100 times at 5 ms in a coherent Ising machine (referring to Non-Patent Literature 1) is 32457. On the other hand, according to Non-Patent Literature 1, the average value of the "cut number" for 100 times at 50 ms in simulated annealing is 32314. Thus, by the calculation according to the embodiment, a solution that has higher accuracy is obtained in a short period of time than in a coherent Ising machine or in simulated annealing.

Figure 12:
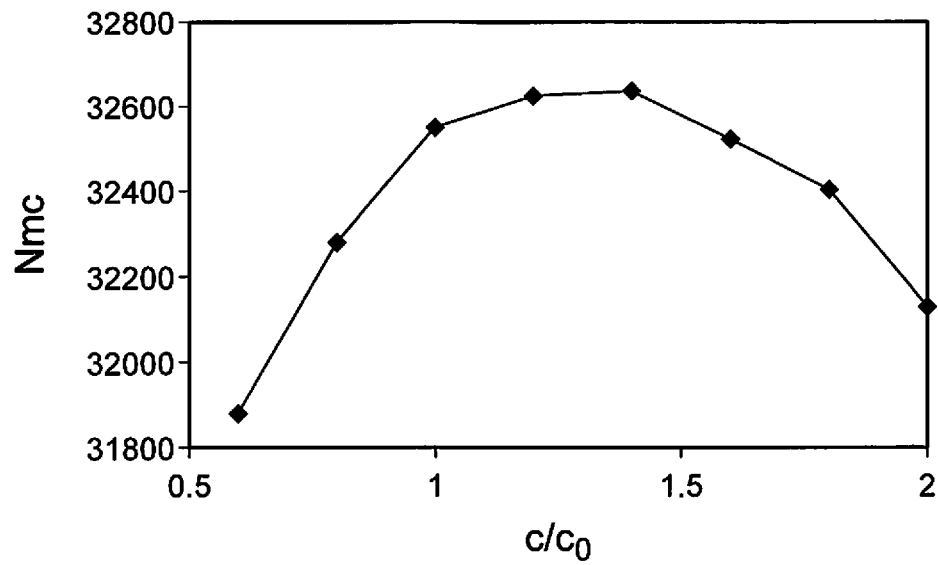
FIG. 12 is a graph illustrating a characteristic of the calculation according to the embodiment.

FIG. 12 is a graph illustrating a characteristic of the calculation according to the embodiment.

FIG. 12 shows an example of the relationship between "c" and the "cut number" obtained by the calculation. The vertical axis of FIG. 12 is "$c/c_0$." As described above, $c_0 = D/(2N^{1/2})$. The vertical axis of FIG. 12 is the cut number Nmc.

As shown in FIG. 12, a large cut number Nmc is obtained when "$c/c_0$" is not less than about 1 and not more than about 1.5.

The second calculation example (the case of N=100000) will now be described. In the second calculation example, the nondiagonal entries of the matrix J and the entries of the vector h are set using "random numbers." As the "random numbers," values of −1 to 1 are set uniformly. The standard deviation a of the nondiagonal entries of the matrix J in such a case is $1/(3^{1/2})$. Therefore, c is set to $3^{1/2}D/(2N^{1/2})$. For the other parameters, Q=1250; dp*($t_1$/dt)=D=2; $t_1$=50; dt=0.5; and M=5.

Figure 13:
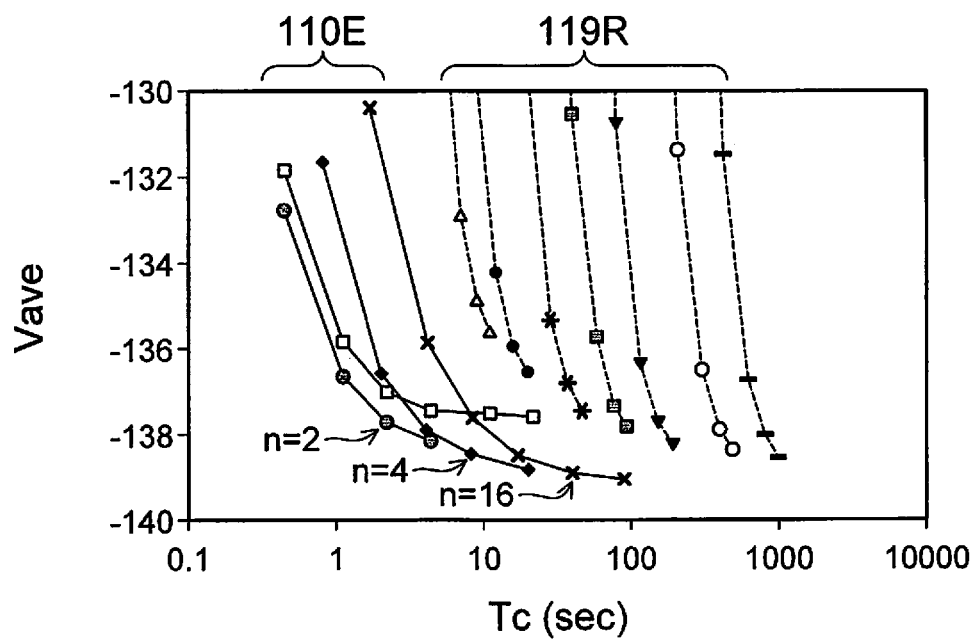
FIG. 13 is a graph illustrating calculation results.

FIG. 13 is a graph illustrating the calculation results.

FIG. 13 shows the results of the second calculation example for the first calculation method according to the embodiment (the first calculating device, the eighth formula, and the tenth formula) and the results of the second calculation example for a calculation according to a reference example. The horizontal axis of FIG. 13 is a calculation time Tc (seconds). The vertical axis is an average value Vave of the Ising energy for 100 times. A calculation result 110E according to the embodiment and a calculation result 119R of the reference example are shown in FIG. 13. The number of computing cores is 1250 in these calculation examples.

For the calculation result 110E of the first calculation method according to the embodiment (the first calculating device, the eighth formula, and the tenth formula), "n" is the value of "n" in the fourteenth formula in the case where the nonlinear function of the fourteenth formula is used. For the calculation result 110E, the curve for which "n" is not notated corresponds to the case where the eighth formula is used.

A calculation using simulated annealing is performed for the calculation result 119R of the reference example. In the simulated annealing, parallel computation of the energy change due to spin reversal is performed using an MPI. In these calculations, the inverse temperature is increased linearly. The increase rates are different between the multiple curves of the calculation result 119R of the reference example.

It can be seen from FIG. 13 that the final average value Vave is low (the absolute value is large) for the calculation result 110E of the first calculation method according to the embodiment (the first calculating device, the eighth formula, and the tenth formula). Conversely, in the calculation results of the reference example, the final average value Vave is insufficiently low (the absolute value is insufficiently large). Thus, a calculation result that has high accuracy is obtained in the embodiment. According to the embodiment, compared to the reference example (the simulated annealing), the calculation time Tc necessary to obtain the same accuracy is 1/10 or less. Compared to the reference example, the calculation according to the embodiment is at least 10 times faster.

A third calculation example of the calculation according to the embodiment will now be described. In the third calculation example, the calculation recited above is performed using a GPU. In the calculation, for example, the variables and the parameters are treated as floating (32-bit floating-point numbers).

In this method, the first variable set {x}, the second variable set {y}, the first parameter set {J}, and the second parameter set {h} are defined as the device variables. The first parameter set {J} is the matrix J. The update of the second variable y using the product-sum operation of the matrix and the first variable x is performed using a matrix-vector product function. For the other updates relating to the first variable x and the second variable y, the updates of the ith entries ($x_i$ and $y_i$) are performed in one thread.

In the third calculation example, the "$K_{2000}$" problem is calculated using one GPU and using conditions similar to those of the first calculation example. The calculation time of the third calculation example is 14.7 ms; and the average value of the "cut number" for 100 times is 32549. In the third calculation example as well, the calculation can be faster than the result of the simulated annealing of the reference example.

An example of the first calculation method and the second calculation method (the first calculating device and the second calculating device) will now be described.

Figure 14A:
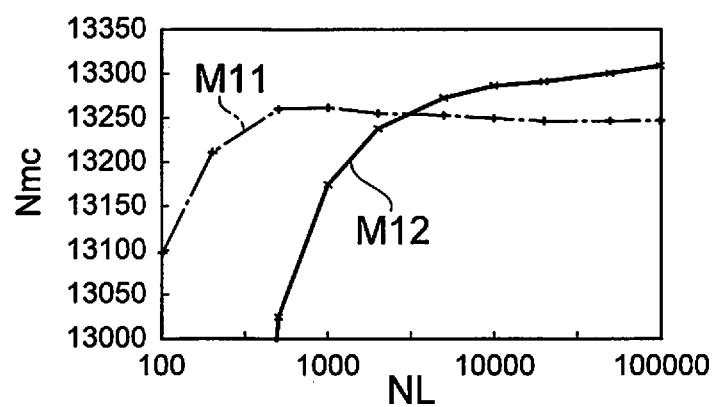
FIG. 14A and FIG. 14B are graphs illustrating the calculation results.
Figure 14B:
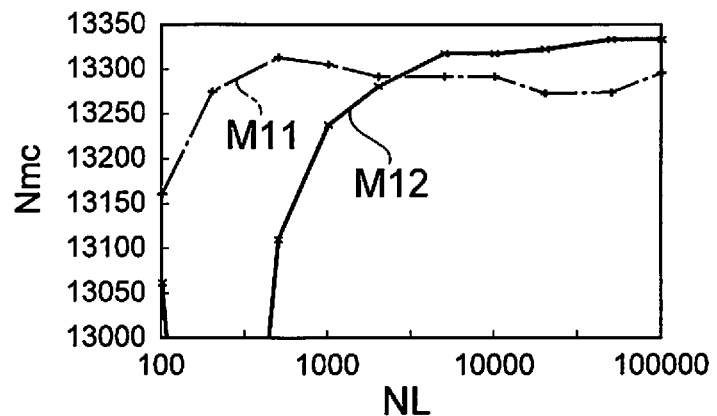

FIG. 14A and FIG. 14B are graphs illustrating the calculation results.

These figures show examples of the calculation results of a "$G_{22}$" problem (referring to Non-Patent Literature 1). In these figures, a calculation result M11 of the first calculation method (the first calculating device, the eighth formula, and the tenth formula) and a calculation result M12 of the second calculation method (the second calculating device and the eleventh to thirteenth formulas) are shown. In the calculation result M11, the initial value $y_i(0)$ of the second variable y has values of random numbers in the range not less than −0.1 and not more than 0.1. In the calculation result M12, the initial value $y_i(0)$ of the second variable y has values of random numbers in the range not less than −0.1 and not more than 0.1. In the second calculation method (the second calculating device and the eleventh to thirteenth formulas), the first calculation parameter T(t) decreases monotonously from 1 toward 0 every processing procedure (loop). The calculations are performed 100 times while changing the values of the random numbers.

FIG. 14A is the average value of 100 calculations. FIG. 14B is the maximum value of 100 calculations. In these figures, the horizontal axis is a number of repetitions NL of the processing procedure. The vertical axis is the cut number Nmc. In one loop, all of the N first variables x and the N second variables y are updated. The third variable z also is updated in the one loop.

As shown in FIG. 14A and FIG. 14B, when the number of repetitions NL of the processing procedure is 3000 or more, the cut number Nmc of the second calculation method (the second calculating device and the eleventh to thirteenth formulas) is larger than the cut number Nmc of the first calculation method (the first calculating device, the eighth formula, and the tenth formula). For example, it is considered that the second calculation method (the second calculating device) is advantageous in the case where a relatively long period of time can be spent searching for the solution.

For example, the first calculation parameter T(t) that is included in the ith entry of the first function of the second calculation method (the second calculating device) corresponds to temperature. According to the second calculation method (the second calculating device), for example, convergence to a good solution is obtained even for a large initial momentum (the initial value $y_i(0)$ of the second variable y). It is easier to search in a wider range by using a large initial momentum.

Second Embodiment

In a calculating device (a calculation method) according to a second embodiment, the following seventeenth to twentieth formulas are used instead of the eleventh to thirteenth formulas described in reference to the second calculation method recited above.

$$\frac{dx_i}{dt} = \frac{1}{b^2} y_i \quad (17)$$

$$\frac{dy_i}{dt} = -[D - p(t)]x_i - x_i^3 + c\sum_{j=1}^{N} J_{ij}x_j \quad (18)$$

$$\frac{db}{dt} = \frac{P_b}{V} \quad (19)$$

$$\frac{dP_b}{dt} = \frac{1}{b^3}\sum_{i=1}^{N} y_i^2 - \frac{T(N+1)}{b} \quad (20)$$

A third variable b is introduced as shown in the seventeenth formula. The third variable b is different from the third variable set {z} described in reference to the first embodiment.

The calculating device according to the second embodiment includes the processor 20 repeating the processing procedure described below. The processing procedure includes the first variable update, the second variable update, the third variable update, and a fourth variable update.

For example, the first variable update is performed based on the seventeenth formula. The first variable update includes, for example, updating the ith entry of the first variable $x_i$ by adding the ith entry of the first function to the ith entry of the first variable $x_i$ before the first variable update. The ith entry of the first variable $x_i$ is one of the first variable set {x}. The variable of the ith entry of the first function includes the ith entry of the second variable $y_i$ and the third variable b. The ith entry of the second variable $y_i$ is one of the second variable set {y}. The ith entry of the first function is one of the first function set. In the example shown in the seventeenth formula, the first function is $y_i/b^2$.

The second variable update is performed based on the eighteenth formula. The second variable update includes, for example, updating the ith entry of the second variable $y_i$ by adding the ith entry of the second function and the ith entry of the third function to the ith entry of the second variable $y_i$ before the second variable update. The variable of the ith entry of the second function includes the ith entry of the first variable $x_i$. The variable of the ith entry of the third function includes at least a part of the first parameter set {J} and at least a part of the first variable set {x}.

For example, the ith entry of the second function corresponds to the term including "$x_i$" of the eighteenth formula. The ith entry of the third function corresponds to the term of the sum over "j" of the eighteenth formula.

The third variable update (the update of the third variable b) is performed based on the nineteenth formula. The third variable update includes, for example, updating the third variable b by adding the first element function to the third variable b before the third variable update. The third variable b is one of the third variable set {b}. The variable of the first element function includes a fourth variable $P_b$. In the example of the nineteenth formula, the first element function corresponds to "($P_b/V$)." For example, "V" corresponds to the mass of the degrees of freedom (the third variable b).

For example, the fourth variable update (the update of the fourth variable $P_b$) is performed based on the twentieth formula. The fourth variable update includes, for example, updating the fourth variable $P_b$ by adding the second element function to the fourth variable $P_b$ before the fourth variable update. The fourth variable $P_b$ is one of a fourth variable set {Pb}.

In the example shown in the twentieth formula, the variable of the second element function includes the difference between the first calculation parameter and the mean square of at least a part of the second variable set {y}. The mean square corresponds to the first term of the twentieth formula. The first calculation parameter corresponds to the second term of the twentieth formula.

The processor 20 performs at least an output of at least one of the ith entry of the first variable $x_i$ obtained after repeating the processing procedure or a function of the ith entry of the first variable $x_i$ obtained after repeating the processing procedure.

In the second embodiment as well, a simultaneous update (a parallel update) is possible. For example, the random numbers are unnecessary. For example, the repetition of the processing procedure can be performed by performing the product-sum operation. A calculating device can be provided in which the optimization problem can be calculated quickly.

The processing (e.g., the parallel processing, etc.) described in reference to the first embodiment is applicable to the calculating device (and the calculation method) according to the second embodiment.

Third Embodiment

In a calculating device (a calculation method) according to a third embodiment, the following twenty-first to twenty-sixth formulas are used instead of the first to thirteenth formulas described in reference to the second calculation method recited above.

$$\frac{dx_i}{dt} = \frac{1}{b} y_i \qquad (21)$$

$$\frac{dy_i}{dt} = b\left\{-[D-p(t)]x_i - x_i^3 + c\sum_{j=1}^{N} J_{ij}x_j\right\} \qquad (22)$$

$$\frac{db}{dt} = \frac{bP_b}{V} \qquad (23)$$

$$\frac{dP_b}{dt} = \frac{1}{b^2}\sum_{i=1}^{N} y_i^2 - TN - \Delta H \qquad (24)$$

$$\Delta H = \frac{1}{2b^2}\sum_{i=1}^{N} y_i^2 + \sum_{i=1}^{N}\left(\frac{D-p(t)}{2}x_i^2 + \frac{1}{4}x_i^4\right) - \frac{c}{2}\sum_{i=1}^{N}\sum_{j=1}^{N} J_{ij}x_i x_j + \frac{P_b^2}{2V} + TN\log b - B \qquad (25)$$

$$\Delta H(t=0) = 0 \qquad (26)$$

As shown in the twenty-first formula, the third variable b is introduced. The third variable b is different from the third variable set {z} described in reference to the first embodiment.

The calculating device according to the third embodiment includes the processor 20 repeating the processing procedure described below. The processing procedure includes the first variable update, the second variable update, the third variable update, and the fourth variable update.

For example, the first variable update is performed based on the twenty-first formula. The first variable update includes updating the ith entry of the first variable $x_i$ by adding the ith entry of the first function to the ith entry of the first variable $x_i$ before the first variable update. The ith entry of the first variable $x_i$ is one of the first variable set {x}. The variable of the ith entry of the first function includes the ith entry of the second variable $y_i$ and the third variable b. The ith entry of the second variable $y_i$ is one of the second variable set {y}. The ith entry of the first function is one of the first function set.

In the example of the twenty-first formula, the ith entry of the first function is $y_i/b$.

The second variable update is performed based on the twenty-second formula. The second variable update includes updating the ith entry of the second variable $y_i$ by adding, to the ith entry of the second variable $y_i$ before the second variable update, the product of the third variable b and the sum of the ith entry of the second function and the ith entry of the third function. The variable of the ith entry of the second function includes the ith entry of the first variable $x_i$. The variable of the ith entry of the third function includes at least a part of the first parameter set {J} and at least a part of the first variable set {x}.

In the example of the twenty-second formula, for example, the ith entry of the second function corresponds to the term including "$x_i$" of the twenty-second formula. The ith entry of the third function corresponds to the term of the sum over "j" of the twenty-second formula.

For example, the third variable update (the update of the third variable b) is performed based on the twenty-third formula. The third variable update includes updating the third variable b by adding the first element function to the third variable b before the third variable update. The third variable b is one of the third variable set {b}. The variable of the first element function includes the fourth variable $P_b$.

As shown in the twenty-third formula, the variable of the first element function includes the product of the third variable b and the fourth variable $P_b$. In the example of the twenty-third formula, the first element function corresponds to "(b·$P_b$)/V."

For example, the fourth variable update (the update of the fourth variable $P_b$) is performed based on the twenty-fourth formula. The fourth variable update includes updating the fourth variable $P_b$ by adding the second element function to the fourth variable $P_b$ before the fourth variable update. The fourth variable $P_b$ is one of the fourth variable set {$P_b$}. The variable of the second element function includes the difference between the first calculation parameter and the mean square of at least a part of the second variable set {y}.

In the example shown in the twenty-fourth formula, the variable of the second element function includes the difference between the first calculation parameter and the mean square of at least a part of the second variable set {y}. The mean square corresponds to the first term of the twenty-fourth formula. The first calculation parameter corresponds to the second term and the third term of the twenty-fourth formula.

The processor 20 performs at least an output of at least one of the ith entry of the first variable $x_i$ obtained after repeating the processing procedure or a function of the ith entry of the first variable $x_i$ obtained after repeating the processing procedure.

In the twenty-fifth formula, "B" is a constant determined to satisfy the twenty-sixth formula.

In the third embodiment as well, a simultaneous update (a parallel update) is possible. For example, the random numbers are unnecessary. For example, the repetition of the processing procedure can be performed by performing the product-sum operation. A calculating device can be provided in which the optimization problem can be calculated quickly.

The processing (e.g., the parallel processing, etc.) described in reference to the first embodiment is applicable to the calculating device (and the calculation method) according to the third embodiment.

Fourth Embodiment

A fourth embodiment includes a circuit in which the calculations described in reference to the first to third embodiments are possible.

Fifth Embodiment

A fifth embodiment relates to a calculation program.

The calculation program causes a computer to repeat the processing procedure described in reference to the first to third embodiments. Hereinbelow, the case will be described where the processing procedure described in reference to the first embodiment is performed.

The processing procedure includes the first variable update, the second variable update, and the third variable update.

The first variable update includes updating the ith entry of the first variable $x_i$ by adding the ith entry of the first function to the ith entry of the first variable $x_i$ before the first variable update (i being an integer not less than 1 and not more than N, and N being an integer of 2 or more). The ith entry of the first variable $x_i$ is one of the first variable set {x}. The variable of the ith entry of the first function includes the ith entry of the second variable $y_i$; and the ith entry of the second variable $y_i$ is one of the second variable set {y}. The ith entry of the first function is one of the first function set.

The second variable update includes updating the ith entry of the second variable $y_i$ by adding, to the ith entry of the second variable $y_i$ before the second variable update, the arithmetic result of the ith entry of the second function, the ith entry of the third function, and the ith entry of the first element function. The variable of the ith entry of the second function includes the ith entry of the first variable $x_i$. The variable of the ith entry of the third function includes at least a part of the first parameter set $\{J\}$ and at least a part of the first variable set $\{x\}$. The variable of the ith entry of the first element function includes the product of the ith entry of the second variable $y_i$ and the third variable z. The ith entry of the second function is one of the second function set. The ith entry of the third function is one of the third function set. The ith entry of the first element function is one of the first element function set.

The third variable update includes updating the third variable z by adding the ith entry of the second element function to the third variable z before the third variable update. The third variable z is one of the third variable set $\{z\}$. The variable of the second element function includes the difference between the first calculation parameter and the mean square of at least a part of the second variable set $\{y\}$.

The processor performs at least an output of at least one of the ith entry of the first variable $x_i$ obtained after repeating the processing procedure or a function of the ith entry of the first variable $x_i$ obtained after repeating the processing procedure.

The processing described in reference to the second embodiment and the third embodiment is applicable to the calculation program according to the embodiment.

Sixth Embodiment

A sixth embodiment is a computer-readable recording medium. A program that causes a computer to repeat the processing procedure described in reference to the first to third embodiments is recorded in the recording medium. The case will now be described where the processing procedure described in reference to the first embodiment is performed.

The processing procedure includes the first variable update, the second variable update, and the third variable update.

The first variable update includes updating the ith entry of the first variable $x_i$ by adding the ith entry of the first function to the ith entry of the first variable $x_i$ before the first variable update (i being an integer not less than 1 and not more than N, and N being an integer of 2 or more). The ith entry of the first variable $x_i$ is one of the first variable set $\{x\}$. The variable of the ith entry of the first function includes the ith entry of the second variable $y_i$; and the ith entry of the second variable $y_i$ is one of the second variable set $\{y\}$. The ith entry of the first function is one of the first function set.

The second variable update includes updating the ith entry of the second variable $y_i$ by adding, to the ith entry of the second variable $y_i$ before the second variable update, the arithmetic result of the ith entry of the second function, the ith entry of the third function, and the ith entry of the first element function. The variable of the ith entry of the second function includes the ith entry of the first variable $x_i$. The variable of the ith entry of the third function includes at least a part of the first parameter set $\{J\}$ and at least a part of the first variable set $\{x\}$. The variable of the ith entry of the first element function includes the product of the ith entry of the second variable $y_i$ and the third variable z. The ith entry of the second function is one of the second function set. The ith entry of the third function is one of the third function set. The ith entry of the first element function is one of the first element function set.

The third variable update includes updating the third variable z by adding the ith entry of the second element function to the third variable z before the third variable update. The third variable z is one of the third variable set $\{z\}$. The variable of the second element function includes the difference between the first calculation parameter and the mean square of at least a part of the second variable set $\{y\}$.

The processor performs at least an output of at least one of the ith entry of the first variable $x_i$ obtained after repeating the processing procedure or a function of the ith entry of the first variable $x_i$ obtained after repeating the processing procedure.

The processing described in reference to the second embodiment and the third embodiment is applicable to the recording medium according to the embodiment.

Seventh Embodiment

The embodiment relates to a calculation method. The calculation method performs the processing procedure described in reference to the first to third embodiments. The case will now be described where the processing procedure described in reference to the first embodiment is performed.

The processing procedure includes the first variable update, the second variable update, and the third variable update.

The first variable update includes updating the ith entry of the first variable $x_i$ by adding the ith entry of the first function to the ith entry of the first variable $x_i$ before the first variable update (i being an integer not less than 1 and not more than N, and N being an integer of 2 or more). The ith entry of the first variable $x_i$ is one of the first variable set $\{x\}$. The variable of the ith entry of the first function includes the ith entry of the second variable $y_i$; and the ith entry of the second variable $y_i$ is one of the second variable set $\{y\}$. The ith entry of the first function is one of the first function set.

The second variable update includes updating the ith entry of the second variable $y_i$ by adding, to the ith entry of the second variable $y_i$ before the second variable update, the arithmetic result of the ith entry of the second function, the ith entry of the third function, and the ith entry of the first element function. The variable of the ith entry of the second function includes the ith entry of the first variable $x_i$. The variable of the ith entry of the third function includes at least a part of the first parameter set $\{J\}$ and at least a part of the first variable set $\{x\}$. The variable of the ith entry of the first element function includes the product of the ith entry of the second variable $y_i$ and the third variable z. The ith entry of the second function is one of the second function set. The ith entry of the third function is one of the third function set. The ith entry of the first element function is one of the first element function set.

The third variable update includes updating the third variable z by adding the ith entry of the second element function to the third variable z before the third variable update. The third variable z is one of the third variable set $\{z\}$. The variable of the second element function includes the difference between the first calculation parameter and the mean square of at least a part of the second variable set $\{y\}$.

The processor performs at least an output of at least one of the ith entry of the first variable $x_i$ obtained after repeating the processing procedure or a function of the ith entry of the first variable $x_i$ obtained after repeating the processing procedure.

The processing described in reference to the second embodiment and the third embodiment is applicable to the recording medium according to the embodiment.

For example, the processing (the instructions) of the various information (the data) recited above is performed based on a program (software). For example, the processing of the various information recited above is performed by a computer storing the program and reading the program.

The processing of the various information recited above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another recording medium.

For example, the information that is recorded in the recording medium can be read by a computer (or an embedded system). The recording format (the storage format) of the recording medium is arbitrary. For example, the computer reads the program from the recording medium and causes the CPU to execute the instructions described in the program based on the program. In the computer, the acquisition (or the reading) of the program may be performed via a network.

At least a part of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium of the embodiments also includes a recording medium to which a program obtained using a LAN, the Internet, etc., is downloaded and stored. The processing recited above may be performed based on multiple recording media.

The computer according to the embodiments includes one or multiple devices (e.g., personal computers, etc.). The computer according to the embodiments may include multiple devices connected by a network.

The embodiments may include, for example, the following configurations (e.g., technological proposals).

Configuration 1

A calculating device, comprising a processor repeating a processing procedure, the processing procedure including a first variable update, a second variable update, and a third variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the ith entry of the first function including an ith entry of a second variable $y_i$, the ith entry of the second variable $y_i$ being one of a second variable set $\{y\}$, the ith entry of the first function being one of a first function set, the second variable update including updating the ith entry of the second variable $y_i$ by adding, to the ith entry of the second variable $y_i$ before the second variable update, an arithmetic result of an ith entry of a second function, an ith entry of a third function, and an ith entry of a first element function, a variable of the ith entry of the second function including the ith entry of the first variable $x_i$, a variable of the ith entry of the third function including at least a part of a first parameter set $\{J\}$ and at least a part of the first variable set $\{x\}$, a variable of the ith entry of the first element function including a product of the ith entry of the second variable $y_i$ and a third variable z, the ith entry of the second function being one of a second function set, the ith entry of the third function being one of a third function set, the ith entry of the first element function being one of a first element function set, the third variable update including updating the third variable z by adding an ith entry of a second element function to the third variable z before the third variable update, the third variable z being one of a third variable set $\{z\}$, a variable of the second element function including a difference between a first calculation parameter and a mean square of at least a part of the second variable set $\{y\}$, the processor performing at least an output of at least one of the ith entry of the first variable $x_i$ obtained after the repeating of the processing procedure or a function of the ith entry of the first variable $x_i$ obtained after the repeating of the processing procedure.

Configuration 2

The calculating device according to Configuration 1, wherein the first calculation parameter after the processing procedure is different from the first calculation parameter before the processing procedure.

Configuration 3

The calculating device according to Configuration 1, wherein the first calculation parameter after the processing procedure is smaller than the first calculation parameter before the processing procedure.

Configuration 4

The calculating device according to any one of Configurations 1 to 3, wherein the second variable update includes a first sub-update and a second sub-update, the first sub-update includes updating the ith entry of the second variable $y_i$ by adding the second function to the ith entry of the second variable $y_i$ before the first sub-update, the second sub-update includes updating the ith entry of the second variable $y_i$ by adding the third function to the ith entry of the second variable $y_i$ before the second sub-update, and the second sub-update is performed after performing the first variable update, the first sub-update, and the third variable update M times (M being an integer of 2 or more); or the first variable update, the first sub-update, and the third variable update are performed M times after the second sub-update.

Configuration 5

The calculating device according to Configuration 4, wherein at least a part of the third variable update is performed simultaneously with at least a part of the second sub-update.

Configuration 6

The calculating device according to any one of Configurations 1 to 5, wherein one part of the processor performs an update of the part of the second variable set $\{y\}$ and a calculation of the mean square relating to the part of the second variable set $\{y\}$, an other one part of the processor performs an update of an other part of the second variable set $\{y\}$ and a calculation of a mean square relating to the other part of the second variable set $\{y\}$, and at least a part of the performing of the update of the part of the second variable set $\{y\}$ and the calculation of the mean square relating to the part of the second variable set $\{y\}$ is performed simultaneously with at least a part of the performing of the update of the other part of the second variable set $\{y\}$ and the calculation of the mean square relating to the other part of the second variable set $\{y\}$.

Configuration 7

The calculating device according to any one of Configurations 1 to 5, wherein one part of the processor performs a first update, a first calculation, and a second update, the first update including an update of the part of the second variable set $\{y\}$, the first calculation including a calculation of the mean square relating to the part of the second variable set $\{y\}$, the second update including an update using the mean square of one of the third variables z included in the third variable set $\{z\}$, an other one part of the processor performs a third update, a second calculation, and a fourth update, the third update including an update of an other part of the second variable set $\{y\}$, the second calculation including a calculation of the mean square relating to the other part of the second variable set $\{y\}$, the fourth update including an update using the mean square of an other one of the third variables z included in the third variable set $\{z\}$, and at least a part of the performing of the first update, the first calculation, and the second update is performed simultaneously with at least a part of the performing of the third update, the second calculation, and the fourth update.

Configuration 8

The calculating device according to any one of Configurations 1 to 7, wherein the ith entry of the second function includes an ith entry of a fourth function having the ith entry of the first variable $x_i$ as a variable, the ith entry of the fourth function includes a nonlinear function of the first variable $x_i$, the ith entry of the fourth function includes an operation parameter p, the operation parameter p changes when the processing procedure is repeated, and a number of real roots of the ith entry of the fourth function after the processing procedure is repeated is different from a number of real roots of the ith entry of the fourth function before the processing procedure is repeated.

Configuration 9

The calculating device according to any one of Configurations 1 to 7, wherein the first variable update includes acquiring, from a storer, the ith entry of the first variable $x_i$ before the first variable update, and storing, in the storer, the ith entry of the first variable $x_i$ after the first variable update, and the second variable update includes acquiring, from the storer, the ith entry of the second variable $y_i$ before the second variable update, and storing, in the storer, the ith entry of the second variable $y_i$ after the second variable update.

Configuration 10

The calculating device according to Configuration 9, wherein the third variable update includes acquiring, from the storer, the third variable z before the third variable update, and storing, in the storer, the third variable z after the third variable update.

Configuration 11

The calculating device according to Configuration 9 or 10, wherein the first variable update further includes acquiring at least a part of the second variable set $\{y\}$ from the storer, calculating the ith entry of the first function, and updating the ith entry of the first variable $x_i$ by adding the ith entry of the first function to the ith entry of the first variable $x_i$, and the second variable update further includes acquiring the ith entry of the first variable $x_i$ from the storer, calculating the ith entry of the second function, acquiring the at least a part of the first parameter set $\{J\}$ and the at least a part of the first variable set $\{x\}$ from the storer, calculating the ith entry of the third function, and updating the ith entry of the second variable $y_i$ by adding the ith entry of the second function and the ith entry of the third function to the ith entry of the second variable $y_i$.

Configuration 12

The calculating device according to any one of Configurations 9 to 11, wherein the processor includes a first calculator and a second calculator, the first calculator performs a part of a calculation of the third function, the second calculator performs an other part of the calculation of the third function, and at least a part of the performing of the part of the calculation of the third function by the first calculator and at least a part of the performing of the other part of the calculation of the third function by the second calculator are performed simultaneously.

Configuration 13

The calculating device according to any one of Configurations 9 to 12, wherein the storer includes a first storage region and a second storage region, the first parameter set $\{J\}$ includes a first-calculation-used part and a second-calculation-used part, the first-calculation-used part being used in the part of the calculation of the third function, the second-calculation-used part being used in the other part of the calculation of the third function, the first calculator stores the first-calculation-used part in the first storage region, and the second calculator stores the second-calculation-used part in the second storage region.

Configuration 14

A calculating device, comprising a processor repeating a processing procedure, the processing procedure including a first variable update, a second variable update, a third variable update, and a fourth variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the ith entry of the first function including an ith entry of a second variable $y_i$ and a third variable b, the ith entry of the second variable $y_i$ being one of a second variable set $\{y\}$, the ith entry of the first function being one of a first function set, the second variable update including updating the ith entry of the second variable $y_i$ by adding an ith entry of a second function and an ith entry of a third function to the ith entry of the second variable $y_i$ before the second variable update, a variable of the ith entry of the second function including the ith entry of the first variable $x_i$, a variable of the ith entry of the third function including at least a part of a first parameter set $\{J\}$ and at least a part of the first variable set $\{x\}$, the third variable update including updating the third variable b by adding a first element function to the third variable b before the third variable update, a variable of the first element function including a fourth variable $P_b$, the fourth variable update including updating the fourth variable $P_b$ by adding a second element function to the fourth variable $P_b$ before the fourth variable update, a variable of the second element function including a difference between a first calculation parameter and a mean square of at least a part of the second variable set {y}, the processor performing at least an output of at least one of the ith entry of the first variable $x_i$ obtained after the repeating of the processing procedure or a function of the ith entry of the first variable $x_i$ obtained after the repeating of the processing procedure.

Configuration 15

The calculating device according to Configuration 14, wherein the ith entry of the first function is $y_i/b^2$.

Configuration 16

A calculating device, comprising a processor repeating a processing procedure, the processing procedure including a first variable update, a second variable update, a third variable update, and a fourth variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set {x}, a variable of the ith entry of the first function including an ith entry of a second variable $y_i$ and a third variable b, the ith entry of the second variable $y_i$ being one of a second variable set {y}, the ith entry of the first function being one of a first function set, the second variable update including updating the ith entry of the second variable $y_i$ by adding, to the ith entry of the second variable $y_i$ before the second variable update, a product of the third variable b and a sum of an ith entry of a second function and an ith entry of a third function, a variable of the ith entry of the second function including the ith entry of the first variable $x_i$, a variable of the ith entry of the third function including at least a part of a first parameter set {J} and at least a part of the first variable set {x}, the third variable update including updating the third variable b by adding a first element function to the third variable b before the third variable update, a variable of the first element function including a fourth variable $P_b$, the fourth variable update including updating the fourth variable $P_b$ by adding a second element function to the fourth variable $P_b$ before the fourth variable update, a variable of the second element function including a difference between a first calculation parameter and a mean square of at least a part of the second variable set {y}, the processor performing at least an output of at least one of the ith entry of the first variable $x_i$ obtained after the repeating of the processing procedure or a function of the ith entry of the first variable $x_i$ obtained after the repeating of the processing procedure.

Configuration 17

The calculating device according to Configuration 16, wherein the variable of the first element function includes a product of the third variable b and the fourth variable $P_b$.

Configuration 18

A calculation program causing a computer to repeat a processing procedure, the processing procedure including a first variable update, a second variable update, and a third variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set {x}, a variable of the ith entry of the first function including an ith entry of a second variable $y_i$, the ith entry of the second variable $y_i$ being one of a second variable set {y}, the ith entry of the first function being one of a first function set, the second variable update including updating the ith entry of the second variable $y_i$ by adding, to the ith entry of the second variable $y_i$ before the second variable update, an arithmetic result of an ith entry of a second function, an ith entry of a third function, and an ith entry of a first element function, a variable of the ith entry of the second function including the ith entry of the first variable $x_i$, a variable of the ith entry of the third function including at least a part of a first parameter set {J} and at least a part of the first variable set {x}, a variable of the ith entry of the first element function including a product of the ith entry of the second variable $y_i$ and a third variable z, the ith entry of the second function being one of a second function set, the ith entry of the third function being one of a third function set, the ith entry of the first element function being one of a first element function set, the third variable update including updating the third variable z by adding an ith entry of a second element function to the third variable z before the third variable update, the third variable z being one of a third variable set {z}, a variable of the second element function including a difference between a first calculation parameter and a mean square of at least a part of the second variable set {y}, the processor performing at least an output of at least one of the ith entry of the first variable $x_i$ obtained after the repeating of the processing procedure or a function of the ith entry of the first variable $x_i$ obtained after the repeating of the processing procedure.

Configuration 19

A recording medium, the recording medium being computer-readable, a calculation program being recorded in the recording medium, the calculation program causing a computer to repeat a processing procedure, the processing procedure including a first variable update, a second variable update, and a third variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set {x}, a variable of the ith entry of the first function including an ith entry of a second variable $y_i$, the ith entry of the second variable $y_i$ being one of a second variable set {y}, the ith entry of the first function being one of a first function set, the second variable update including updating the ith entry of the second variable $y_i$ by adding, to the ith entry of the second variable $y_i$ before the second variable update, an arithmetic result of an ith entry of a second function, an ith entry of a third function, and an ith entry of a first element function, a variable of the ith entry of the second function including the ith entry of the first variable $x_i$, a variable of the ith entry of the third function including at least a part of a first parameter set {J} and at least a part of the first variable set {x}, a variable of the ith entry of the first element function including a product of the ith entry of the second variable $y_i$ and a third variable z, the ith entry of the second function being one of a second function set, the ith entry of the third function being one of a third function set, the ith entry of the first element function being one of a first element function set, the third variable update including updating the third variable z by adding an ith entry of a second element function to the third variable z before the third variable update, the third variable z being one of a third variable set {z}, a variable of the second element function including a difference between a first calculation parameter and a mean square of at least a part of the second variable set {y}, the processor performing at least an output of at least one of the ith entry of the first variable $x_i$ obtained after the repeating of the processing procedure or a function of the ith entry of the first variable $x_i$ obtained after the repeating of the processing procedure.

Configuration 20

A calculation method, comprising repeating a processing procedure, the processing procedure including a first variable update, a second variable update, and a third variable update, the first variable update including updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set {x}, a variable of the ith entry of the first function including an ith entry of a second variable $y_i$, the ith entry of the second variable $y_i$ being one of a second variable set {y}, the ith entry of the first function being one of a first function set, the second variable update including updating the ith entry of the second variable $y_i$ by adding, to the ith entry of the second variable $y_i$ before the second variable update, an arithmetic result of an ith entry of a second function, an ith entry of a third function, and an ith entry of a first element function, a variable of the ith entry of the second function including the ith entry of the first variable $x_i$, a variable of the ith entry of the third function including at least a part of a first parameter set {J} and at least a part of the first variable set {x}, a variable of the ith entry of the first element function including a product of the ith entry of the second variable $y_i$ and a third variable z, the ith entry of the second function being one of a second function set, the ith entry of the third function being one of a third function set, the ith entry of the first element function being one of a first element function set, the third variable update including updating the third variable z by adding an ith entry of a second element function to the third variable z before the third variable update, the third variable z being one of a third variable set {z}, a variable of the second element function including a difference between a first calculation parameter and a mean square of at least a part of the second variable set {y}, the processor performing at least an output of at least one of the ith entry of the first variable $x_i$ obtained after the repeating of the processing procedure or a function of the ith entry of the first variable $x_i$ obtained after the repeating of the processing procedure.

According to the embodiments, a calculating device, a calculation program, a recording medium, and a calculation method can be provided in which an optimization problem can be calculated quickly.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in calculating devices such as processors, acquirers, storers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all calculating devices, calculation programs, recording media, and calculation methods practicable by an appropriate design modification by one skilled in the art based on the calculating devices, the calculation programs, the recording media, and the calculation methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A calculating device for solving a combinatorial optimization problem in a Hamiltonian nonlinear dynamical system using bifurcation phenomenon and an Ising energy model of the nonlinear dynamical system, comprising:

a processor; and a memory storing a program of instructions which when executed by the processor perform:

setting initial values of variables near one initial stable fixed point in an operation of the dynamical system;

generating multiple stable fixed points by bifurcation, by causing the values of the variables to move toward vicinity of one of the multiple stable fixed points;

splitting each variable value at the stable fixed points after the bifurcation into a positive value and a negative value, a sign of each value being associated with Ising spins forming discrete variables of the Ising problem;

generating discrete variables of the combinatorial optimization corresponding to the multiple stable fixed points generated, thus generating a discrete optimization problem;

performing calculations repeatedly using the calculating device comprising at least a first calculator and a second calculator to solve the Ising energy model quickly using a procedure;

wherein:

Ising energy is represented by a first formula comprising the number of Ising spins, N, the Ising spin of the $i^{th}$ entry, s and first parameter set {J} represented in a matrix, J which is a real symmetric matrix with diagonal entries of the matrix being zero;

the calculating device performs a calculation method in which a first variable update, a second variable update, and a third variable update are performed using certain formulas which involve adding values of certain entries of certain functions;

the first variable update includes updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the ith entry of the first function including an ith entry of a second variable $y_i$, the ith entry of the second variable $y_i$ being one of a second variable set $\{y\}$, the ith entry of the first function being one of a first function set, the second variable update includes updating the ith entry of the second variable $y_i$ by adding, to the ith entry of the second variable $y_i$ before the second variable update, an arithmetic result of an ith entry of a second function, an ith entry of a third function, and an ith entry of a first element function, a variable of the ith entry of the second function including the ith entry of the first variable $x_i$, a variable of the ith entry of the third function including at least a part of a first parameter set $\{J\}$ and at least a part of the first variable set $\{x\}$, a variable of the ith entry of the first element function including a product of the ith entry of the second variable $y_i$ and a third variable z, the ith entry of the second function being one of a second function set, the ith entry of the third function being one of a third function set, the ith entry of the first element function being one of a first element function set, the third variable update includes updating the third variable z by adding an ith entry of a second element function to the third variable z before the third variable update, the third variable z being one of a third variable set $\{z\}$, a variable of the second element function including a difference between a first calculation parameter and a mean square of at least a part of the second variable set $\{y\}$, the processor is configured to perform at least an output of at least one of the ith entry of the first variable $x_i$ obtained after the repeating of the processing procedure or a function of the ith entry of the first variable $x_i$ obtained after the repeating of the processing procedure, wherein:
the first calculator performs a part of a calculation of the third function,
the second calculator performs an other part of the calculation of the third function, and
at least a part of the performing of the part of the calculation of the third function by the first calculator and at least a part of the performing of the other part of the calculation of the third function by the second calculator are performed simultaneously;

multiple variables are updated simultaneously using a parallel update algorithm which provides higher speeds due to parallel computation;

the equations of motion of the dynamical system are solved numerically by discretizing the differential equations generated by a fourth-order Runge-Kutta method and generating algebraic equations;

the final value of the first variable becomes the Ising spin $s_i$ of the optimal solution;

the accuracy of the solution of the Ising problem is increased; and the average value of the Ising energy is obtained after many iterations of the procedure.

2. The calculating device according to claim 1, wherein the first calculation parameter after the processing procedure is different from the first calculation parameter before the processing procedure.

3. The calculating device according to claim 1, wherein the first calculation parameter after the processing procedure is smaller than the first calculation parameter before the processing procedure.

4. The calculating device according to claim 1, wherein
the second variable update includes a first sub-update and a second sub-update,
the first sub-update includes updating the ith entry of the second variable $y_i$ by adding the second function to the ith entry of the second variable $y_i$ before the first sub-update,
the second sub-update includes updating the ith entry of the second variable $y_i$ by adding the third function to the ith entry of the second variable $y_i$ before the second sub-update, and
the second sub-update is performed after performing the first variable update, the first sub-update, and the third variable update M times (M being an integer of 2 or more); or the first variable update, the first sub-update, and the third variable update are performed M times after the second sub-update.

5. The calculating device according to claim 4, wherein at least a part of the third variable update is performed simultaneously with at least a part of the second sub-update.

6. The calculating device according to claim 1, wherein
one part of the processor performs an update of the part of the second variable set $\{y\}$ and a calculation of the mean square relating to the part of the second variable set $\{y\}$,
an other one part of the processor performs an update of an other part of the second variable set $\{y\}$ and a calculation of a mean square relating to the other part of the second variable set $\{y\}$, and
at least a part of the performing of the update of the part of the second variable set $\{y\}$ and the calculation of the mean square relating to the part of the second variable set $\{y\}$ is performed simultaneously with at least a part of the performing of the update of the other part of the second variable set $\{y\}$ and the calculation of the mean square relating to the other part of the second variable set $\{y\}$.

7. The calculating device according to claim 1, wherein
one part of the processor performs a first update, a first calculation, and a second update, the first update including an update of the part of the second variable set $\{y\}$, the first calculation including a calculation of the mean square relating to the part of the second variable set $\{y\}$, the second update including an update using the mean square of one of the third variables z included in the third variable set $\{z\}$,
an other one part of the processor performs a third update, a second calculation, and a fourth update, the third update including an update of an other part of the second variable set $\{y\}$, the second calculation including a calculation of the mean square relating to the other part of the second variable set $\{y\}$, the fourth update including an update using the mean square of an other one of the third variables z included in the third variable set $\{z\}$, and
at least a part of the performing of the first update, the first calculation, and the second update is performed simultaneously with at least a part of the performing of the third update, the second calculation, and the fourth update.

8. The calculating device according to claim 1, wherein
the ith entry of the second function includes an ith entry of a fourth function having the ith entry of the first variable $x_i$ as a variable,
the ith entry of the fourth function includes a nonlinear function of the first variable $x_i$,
the ith entry of the fourth function includes an operation parameter p,
the operation parameter p changes when the processing procedure is repeated, and
a number of real roots of the ith entry of the fourth function after the processing procedure is repeated is different from a number of real roots of the ith entry of the fourth function before the processing procedure is repeated.

9. The calculating device according to claim 1, wherein
the first variable update includes acquiring, from a storer, the ith entry of the first variable $x_i$ before the first variable update, and storing, in the storer, the ith entry of the first variable $x_i$ after the first variable update, and
the second variable update includes acquiring, from the storer, the ith entry of the second variable $y_i$ before the second variable update, and storing, in the storer, the ith entry of the second variable $y_i$ after the second variable update.

10. The calculating device according to claim 9, wherein the third variable update includes acquiring, from the storer, the third variable z before the third variable update, and storing, in the storer, the third variable z after the third variable update.

11. The calculating device according to claim 9, wherein the first variable update further includes acquiring at least a part of the second variable set $\{y\}$ from the storer, calculating the ith entry of the first function, and updating the ith entry of the first variable $x_i$ by adding the ith entry of the first function to the ith entry of the first variable $x_i$, and
the second variable update further includes acquiring the ith entry of the first variable $x_i$ from the storer, calculating the ith entry of the second function, acquiring the at least a part of the first parameter set $\{J\}$ and the at least a part of the first variable set $\{x\}$ from the storer, calculating the ith entry of the third function, and updating the ith entry of the second variable $y_i$ by adding the ith entry of the second function and the ith entry of the third function to the ith entry of the second variable $y_i$.

12. The calculating device according to claim 9, wherein
the storer includes a first storage region and a second storage region,
the first parameter set $\{J\}$ includes a first-calculation-used part and a second-calculation-used part, the first-calculation-used part being used in the part of the calculation of the third function, the second-calculation-used part being used in the other part of the calculation of the third function,
the first calculator stores the first-calculation-used part in the first storage region, and
the second calculator stores the second-calculation-used part in the second storage region.

13. A non-transitory computer readable medium comprising executable instructions for solving a combinatorial optimization problem in a Hamiltonian nonlinear dynamical system using bifurcation phenomenon and an Ising energy model of the nonlinear dynamical system, the instructions when executed by a processor performing a method comprising:

setting initial values of variables near one initial stable fixed point in an operation of the dynamical system;
generating multiple stable fixed points by bifurcation, by causing the values of the variables to move toward vicinity of one of the multiple stable fixed points;
splitting each variable value at the stable fixed points after the bifurcation into a positive value and a negative value, a sign of each value being associated with Ising spins forming discrete variables of the Ising problem;
generating discrete variables of the combinatorial optimization corresponding to the multiple stable fixed points generated, thus generating a discrete optimization problem;
performing calculations repeatedly using a calculating device comprising at least a first calculator and a second calculator to solve the Ising energy model quickly using a procedure;
wherein:
Ising energy is represented by a first formula comprising the number of Ising spins, N, the Ising spin of the $i^{th}$ entry, s and first parameter set $\{J\}$ represented in a matrix, J which is a real symmetric matrix with diagonal entries of the matrix being zero;
the calculating device performs a calculation method in which a first variable update, a second variable update, and a third variable update are performed using certain formulas which involve adding values of certain entries of certain functions;
the first variable update includes updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the ith entry of the first function including an ith entry of a second variable $y_i$, the ith entry of the second variable $y_i$ being one of a second variable set $\{y\}$, the ith entry of the first function being one of a first function set,
the second variable update includes updating the ith entry of the second variable $y_i$ by adding, to the ith entry of the second variable $y_i$ before the second variable update, an arithmetic result of an ith entry of a second function, an ith entry of a third function, and an ith entry of a first element function, a variable of the ith entry of the second function including the ith entry of the first variable $x_i$, a variable of the ith entry of the third function including at least a part of a first parameter set $\{J\}$ and at least a part of the first variable set $\{x\}$, a variable of the ith entry of the first element function including a product of the ith entry of the second variable $y_i$ and a third variable z, the ith entry of the second function being one of a second function set, the ith entry of the third function being one of a third function set, the ith entry of the first element function being one of a first element function set,
the third variable update includes updating the third variable z by adding an ith entry of a second element function to the third variable z before the third variable update, the third variable z being one of a third variable set $\{z\}$, a variable of the second element function including a difference between a first calculation parameter and a mean square of at least a part of the second variable set $\{y\}$,
the processor performs at least an output of at least one of the ith entry of the first variable $x_i$ obtained after the repeating of the processing procedure or a function of the ith entry of the first variable $x_i$ obtained after the repeating of the processing procedure, wherein:
the first calculator performs a part of a calculation of the third function,
the second calculator performs an other part of the calculation of the third function, and
the processing procedure includes performing at least a part of the performing of the part of the calculation of the third function by the first calculator and performing at least a part of the performing of the other part of the calculation of the third function by the second calculator simultaneously;
multiple variables are updated simultaneously using a parallel update algorithm which provides higher speeds due to parallel computation;
the equations of motion of the dynamical system are solved numerically by discretizing the differential equations generated by a fourth-order Runge-Kutta method and generating algebraic equations;
the final value of the first variable becomes the Ising spin s, of the optimal solution;
the accuracy of the solution of the Ising problem is increased; and
the average value of the Ising energy is obtained after many iterations of the procedure.

14. A computing method for solving a combinatorial optimization problem in a Hamiltonian nonlinear dynamical system using bifurcation phenomenon and an Ising energy model of the nonlinear dynamical system, the method when executed by a processor comprising:

setting initial values of variables near one initial stable fixed point in an operation of the dynamical system;
generating multiple stable fixed points by bifurcation, by causing the values of the variables to move toward vicinity of one of the multiple stable fixed points;
splitting each variable value at the stable fixed points after the bifurcation into a positive value and a negative value, a sign of each value being associated with Ising spins forming discrete variables of the Ising problem;
generating discrete variables of the combinatorial optimization corresponding to the multiple stable fixed points generated, thus generating a discrete optimization problem;
performing calculations repeatedly using a calculating device comprising at least a first calculator and a second calculator to solve the Ising energy model quickly using a procedure;

wherein:
Ising energy is represented by a first formula comprising the number of Ising spins, N, the Ising spin of the $i^{th}$ entry, s and first parameter set $\{J\}$ represented in a matrix, J which is a real symmetric matrix with diagonal entries of the matrix being zero;
the calculating device performs a calculation method in which a first variable update, a second variable update, and a third variable update are performed using certain formulas which involve adding values of certain entries of certain functions;
the first variable update includes updating an ith entry of a first variable $x_i$ by adding an ith entry of a first function to the ith entry of the first variable $x_i$ before the first variable update (i being an integer not less than 1 and not more than N, and N being an integer of 2 or more), the ith entry of the first variable $x_i$ being one of a first variable set $\{x\}$, a variable of the ith entry of the first function including an ith entry of a second variable $y_i$, the ith entry of the second variable $y_i$ being one of a second variable set $\{y\}$, the ith entry of the first function being one of a first function set,
the second variable update includes updating the ith entry of the second variable $y_i$ by adding, to the ith entry of the second variable $y_i$ before the second variable update, an arithmetic result of an ith entry of a second function, an ith entry of a third function, and an ith entry of a first element function, a variable of the ith entry of the second function including the ith entry of the first variable $x_i$, a variable of the ith entry of the third function including at least a part of a first parameter set $\{J\}$ and at least a part of the first variable set $\{x\}$, a variable of the ith entry of the first element function including a product of the ith entry of the second variable $y_i$ and a third variable z, the ith entry of the second function being one of a second function set, the ith entry of the third function being one of a third function set, the ith entry of the first element function being one of a first element function set,
the third variable update includes updating the third variable z by adding an ith entry of a second element function to the third variable z before the third variable update, the third variable z being one of a third variable set $\{z\}$, a variable of the second element function including a difference between a first calculation parameter and a mean square of at least a part of the second variable set $\{y\}$,
the processor performing at least an output of at least one of the ith entry of the first variable $x_i$ obtained after the repeating of the processing procedure or a function of the ith entry of the first variable $x_i$ obtained after the repeating of the processing procedure, wherein:
the first calculator performs a part of a calculation of the third function, the second calculator performs an other part of the calculation of the third function, and
the processing procedure includes performing at least a part of the performing of the part of the calculation of the third function by the first calculator and performing at least a part of the performing of the other part of the calculation of the third function by the second calculator simultaneously;
multiple variables are updated simultaneously using a parallel update algorithm which provides higher speeds due to parallel computation;
the equations of motion of the dynamical system are solved numerically by discretizing the differential equations generated by a fourth-order Runge-Kutta method and generating algebraic equations;
the final value of the first variable becomes the Ising spin s, of the optimal solution;
the accuracy of the solution of the Ising problem is increased; and
the average value of the Ising energy is obtained after many iterations of the procedure.

* * * * *